United States Patent
Ota et al.

(10) Patent No.: US 12,159,425 B2
(45) Date of Patent: Dec. 3, 2024

(54) THREE-DIMENSIONAL MEASUREMENT SYSTEM AND THREE-DIMENSIONAL MEASUREMENT METHOD

(71) Applicant: OMRON Corporation, Kyoto (JP)

(72) Inventors: Jun Ota, Kyoto (JP); Shinya Matsumoto, Kyoto (JP); Tetsuya Kiguchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 517 days.

(21) Appl. No.: 17/606,850

(22) PCT Filed: May 22, 2019

(86) PCT No.: PCT/JP2019/020355
§ 371 (c)(1),
(2) Date: Oct. 27, 2021

(87) PCT Pub. No.: WO2020/235067
PCT Pub. Date: Nov. 26, 2020

(65) Prior Publication Data
US 2022/0222843 A1 Jul. 14, 2022

(51) Int. Cl.
*G06T 7/593* (2017.01)
(52) U.S. Cl.
CPC .................... *G06T 7/593* (2017.01)
(58) Field of Classification Search
CPC ........... G06T 7/593; G06T 2207/20076; G06T 7/521; G01B 11/2545; G01B 11/2509; G01B 11/2513
See application file for complete search history.

(56) References Cited

U.S. PATENT DOCUMENTS 10,119,808 B2 * 11/2018 Venkataraman ........ G06T 7/557
10,142,612 B2 * 11/2018 Ge ........................ H04N 13/254
(Continued)

FOREIGN PATENT DOCUMENTS

| EP | 3480556 A1 | 5/2019 |
| JP | 2011013706 A | 1/2011 |

(Continued)

OTHER PUBLICATIONS

Extended European Search Report issued in European Appln. No. 19929385.3 mailed Oct. 10, 2022.
Choi. "Hybrid Approach for Accurate Depth Acquisition with Structured Light and Stereo Camera." IEEE International Symposium on Broadband Multimedia Systems and Broadcasting (BMSB), 2012. IEEE, Jun. 27, 2012. Pages 1-4. XP032222313.
(Continued)

*Primary Examiner* — Pinalben Patel
(74) *Attorney, Agent, or Firm* — ROSSI, KIMMS & McDOWELL LLP

(57) ABSTRACT

A three-dimensional measurement system projects patterned light onto a target object, images the target object from different viewpoints to obtain a first image and a second image, obtains first depth information using the first image with a spatially encoded pattern technique, defines a search range for a corresponding point based on parallax between the first image and the second image predicted from the first depth information, and obtains second depth information by performing stereo matching for the defined search range using the first image and the second image. The second depth information has a higher spatial resolution than the first depth information. The patterned light has a combined pattern combining a spatially encoded pattern including a plurality of unit elements arranged regularly and a random pattern including a plurality of random pieces arranged randomly. Each of the plurality of unit elements is an area corresponding to a depth value.

14 Claims, 17 Drawing Sheets

(56) References Cited

U.S. PATENT DOCUMENTS

| | | | |
|---|---|---|---|
| 10,302,421 B2* | 5/2019 | Heist ................... | G03B 37/04 |
| 10,498,109 B1* | 12/2019 | Tsai ................... | G01B 11/2513 |
| 10,896,516 B1* | 1/2021 | Kantor ................... | G06T 7/74 |
| 10,901,431 B1* | 1/2021 | Ebrahimi Afrouzi ................... | |
| | | | G05D 1/0246 |
| 2010/0328427 A1 | 12/2010 | Sakano | |
| 2014/0078264 A1 | 3/2014 | Zhang | |
| 2015/0287192 A1 | 10/2015 | Sasaki | |
| 2019/0394363 A1* | 12/2019 | Sun ................... | H04N 5/144 |
| 2020/0073531 A1* | 3/2020 | Romano ................... | G01B 11/25 |
| 2020/0166333 A1* | 5/2020 | Zhou ................... | G01B 11/2518 |

FOREIGN PATENT DOCUMENTS

| | | | | |
|---|---|---|---|---|
| JP | 2014138691 A | | 7/2014 | |
| JP | 2017037189 A | | 2/2017 | |
| JP | 2019086294 A | * | 6/2019 | ......... G01B 11/2513 |
| WO | 2018139297 A1 | | 8/2018 | |

OTHER PUBLICATIONS

Li. "Accurate Depth Estimation Using Structured Light and Passive Stereo Disparity Estimation." 18th IEEE International Conference on Image Processing (ICIP), 2011. IEEE, Sep. 11, 2011. pp. 969-972. XP032080659.

Wong. "Fast acquisition of dense depth data by a new structured light scheme." Computer Vision and Image Understanding. Jun. 2005. pp. 398-422. vol. 98, No. 3. XP027222003.

Vuylsteke. "Range Image Acquisition with a Single Binary-Encoded Light Pattern." IEEE Transactions on Pattern Analysis and Machine Intelligence. Feb. 1990: 148-164. vol. 12, No. 2. Cited in Specification.

International Search Report issued in Intl. Appln. No. PCT/JP2019/020355 mailed Jun. 18, 2019. English translation provided.

Written Opinion issued in Intl. Appln. No. PCT/JP2019/020355 mailed Jun. 18, 2019. English translation provided.

* cited by examiner

300: Unit element

Ratio of random pattern S2/S1

1/4 pixels or greater

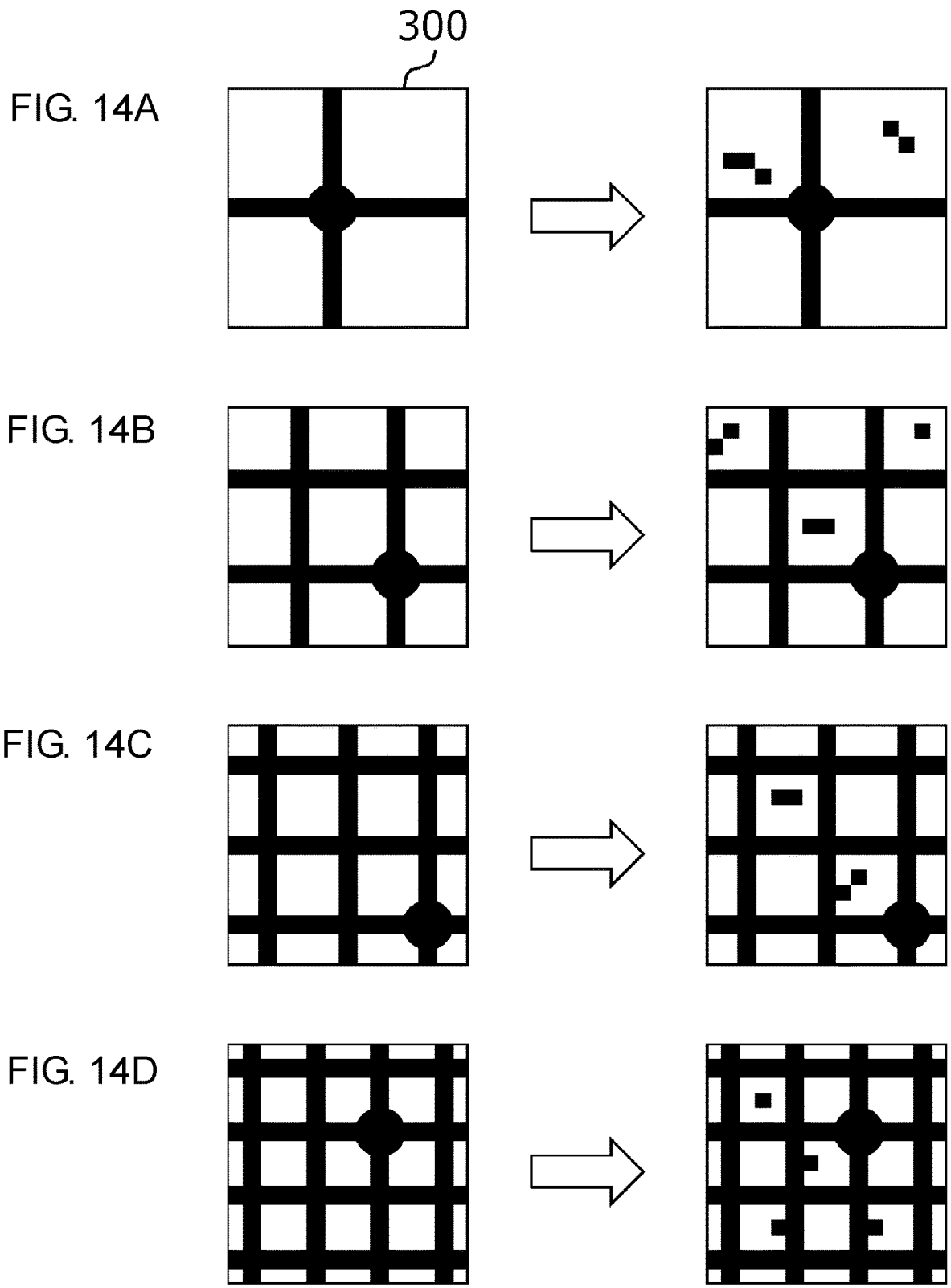

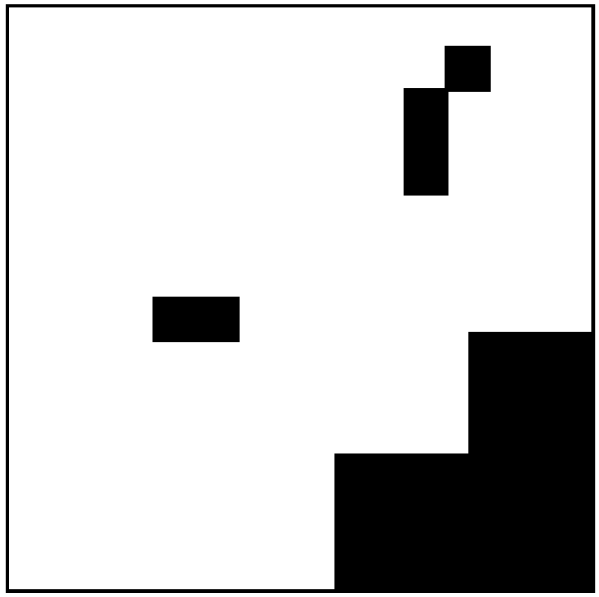
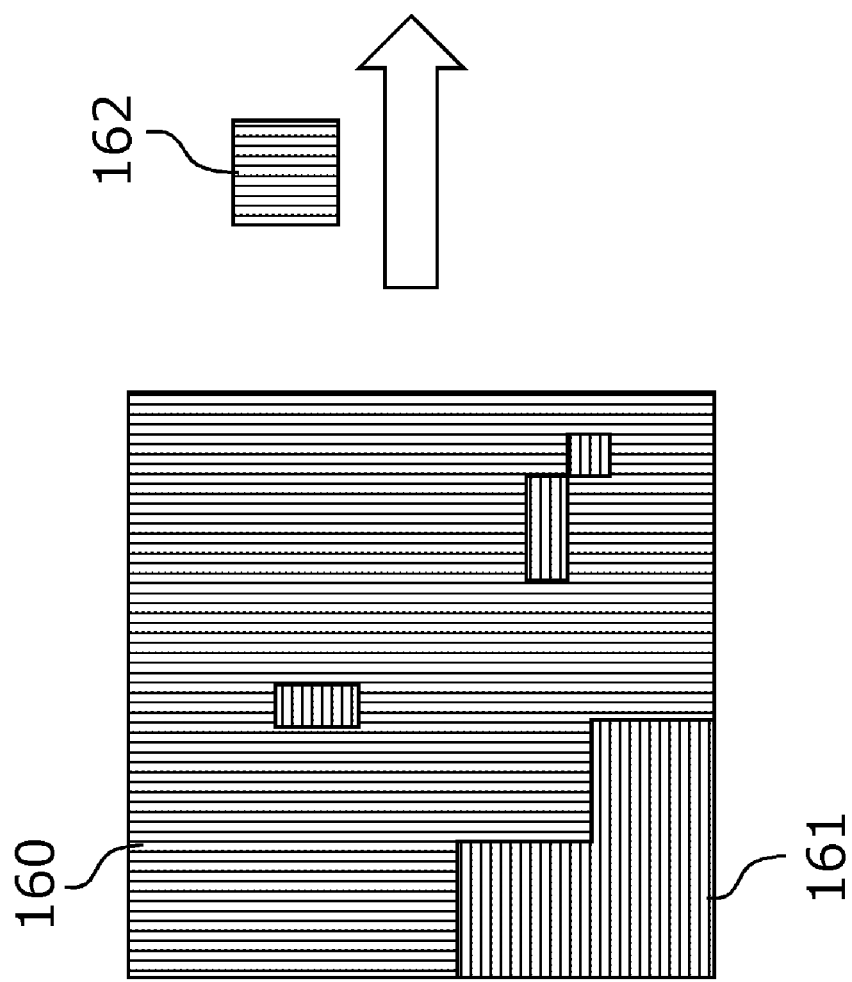

THREE-DIMENSIONAL MEASUREMENT SYSTEM AND THREE-DIMENSIONAL MEASUREMENT METHOD

FIELD

The present invention relates to three-dimensional measurement using images.

BACKGROUND

Active measurement is a known method for three-dimensional (3D) measurement of a target object using images. In active measurement, a target object is imaged with patterned light projected to produce images having a pattern. Based on the pattern position, 3D information (e.g., depth information for each pixel) is obtained using the principle of triangulation.

Non-Patent Literature 1 describes a method for capturing images with a spatially encoded pattern projected onto the surface of a target object and decoding the pattern appearing on the images to obtain depth information. This method allows high-speed and accurate measurement but has a low spatial resolution resulting from using multiple pixels for calculating a depth value.

A known method achieving a higher spatial resolution is stereo matching (also referred to as a stereo camera technique) that uses two images captured from different viewpoints to measure the 3D shape of a target object. FIG. 23 shows the principle of stereo matching. In stereo matching, two cameras are arranged laterally to image a target object O simultaneously and produce two images, for example, a reference image I1 and a comparative image I2. For a pixel (reference point P1) in the reference image I1, the comparative image I2 is searched, along an epipolar line E in the comparative image I2, for a pixel (corresponding point P2) having an image feature closest to the image feature of the pixel (reference point P1). The difference (parallax) in coordinates is then determined between the reference point P1 and the corresponding point P2. Using the geometric positions of the cameras, which are known, and the principle of triangulation, a distance D in the depth direction (depth) is calculated from the parallax to reconstruct the 3D shape of the target object O.

CITATION LIST

Non-Patent Literature

Non-Patent Literature 1: P. Vuylsteke and A. Oosterlinck, Range Image Acquisition with a Single Binary-Encoded Light Pattern, IEEE PAMI 12(2), pp. 148-164, 1990.

SUMMARY

Technical Problem

In stereo matching, higher-resolution cameras allow more accurate measurement and higher spatial resolution with more measurement points (or pixels for which corresponding points have been identified and distance information has been successfully obtained). However, input images including more pixels received from the cameras cause longer time searching for corresponding points, thus greatly increasing the measurement time.

In response to the above issue, one or more aspects of the present invention are directed to measurement using stereo matching that achieves high-accuracy and high-speed processing.

Solution to Problem

A three-dimensional measurement system according to one aspect of the present invention includes a projector that projects patterned light onto a target object, a first camera that images the target object, a second camera that images the target object from a viewpoint different from the first camera, and an image processor that processes a first image received from the first camera and a second image received from the second camera to obtain three-dimensional information about the target object. The image processor includes a first measurer that obtains first depth information using the first image with a spatially encoded pattern technique, a definer that defines a search range for a corresponding point for stereo matching based on parallax between the first image and the second image predicted from the first depth information, and a second measurer that obtains second depth information by performing stereo matching for the defined search range using the first image and the second image. The second depth information has a higher spatial resolution than the first depth information. The patterned light has a combined pattern combining a spatially encoded pattern and a random pattern. The spatially encoded pattern includes a plurality of unit elements arranged regularly. Each of the plurality of unit elements is an area corresponding to a depth value. The random pattern includes a plurality of random pieces arranged randomly.

In typical known stereo matching, the entire comparative image is searched for corresponding points. Thus, high-resolution images unavoidably cause long time processing. In contrast, the above structure limits the search ranges for corresponding points based on predicted parallax. This greatly narrows the search ranges and shortens the time taken for the search for corresponding points. Patterned light with a combined random pattern increases the complexity of the contrast distribution (the variety of image features) on the surface of a target object. This increases the success rate and the accuracy of stereo matching, or specifically the search for corresponding points. The system thus allows high-speed and accurate 3D measurement with high spatial resolution.

The combined pattern may satisfy $0.02 < S2/S1 < 0.12$, where S1 is an area size of each of the plurality of unit elements, and S2 is a total area size of the plurality of random pieces added into an area in each of the plurality of unit elements. The combined pattern satisfying this range allows processing that balances the success rate and the processing time for stereo matching.

The combined pattern may satisfy $0.04 < S2/S1 < 0.1$. The combined pattern satisfying this range may substantially maximize the accuracy and the speed of stereo matching.

Each of the plurality of unit elements may include one or more subelements each representing a value of the unit element. The plurality of random pieces may be added into an area in each of the plurality of unit elements other than an area in which the one or more subelements are located. This arrangement reduces the likelihood that random pieces affect pattern decoding.

Each of the plurality of unit elements may include one or more subelements each representing a value of the unit element. The plurality of random pieces may be added into an area in each of the plurality of unit elements in which the one or more subelements are located. Each of the plurality of random pieces may have a luminance level or a color distinguishable from the one or more subelements. Adding random pieces to be distinguishable by luminance or color allows the random pieces to be superimposed on subelements. This increases flexibility in positioning of additional random pieces, thus allowing random pieces to be combined with spatially encoded patterns with various techniques.

The combined pattern may satisfy S4<S3/2, where S3 is an area size of a smallest subelement of the one or more subelements, and S4 is an area size of a largest random piece of the plurality of random pieces. A random piece smaller than half the subelement in the spatially encoded pattern avoids changing the subelement when being superimposed on the subelement, and thus avoids affecting the pattern decoding rate.

The projector and the first camera may be set to form an image of each of the plurality of unit elements having a size of 3×3 pixels or greater on an image sensor included in the first camera. For a unit element having fewer than three pixels on each side, the subelement in the unit element may fail to be resolved, possibly reducing the pattern decoding rate.

The projector, the first camera, and the second camera may be set to form an image of each of the one or more subelements having a size of 3/2×3/2 pixels or greater on an image sensor included in each of the first camera and the second camera. A subelement having fewer than 3/2 pixels on each side may fail to be resolved sufficiently, possibly reducing the pattern decoding rate.

The projector, the first camera, and the second camera may be set to form an image of each of the plurality of random pieces having a size of ¼×¼ pixels or greater on an image sensor included in each of the first camera and the second camera. Each random piece having this minimum size maintains the effect of the random pattern.

A three-dimensional measurement method according to another aspect of the present invention includes projecting patterned light onto a target object, imaging the target object from different viewpoints to obtain a first image and a second image, obtaining first depth information using the first image with a spatially encoded pattern technique, defining a search range for a corresponding point for stereo matching based on parallax between the first image and the second image predicted from the first depth information, and obtaining second depth information by performing stereo matching for the defined search range using the first image and the second image. The second depth information has a higher spatial resolution than the first depth information. The patterned light has a combined pattern combining a spatially encoded pattern and a random pattern. The spatially encoded pattern includes a plurality of unit elements arranged regularly. Each of the plurality of unit elements is an area corresponding to a depth value. The random pattern includes a plurality of random pieces arranged randomly.

One or more aspects of the present invention may be directed to an image processor or a three-dimensional measurement system including at least part of the above elements. One or more aspects of the present invention may be directed to an image processing method, a three-dimensional measurement method, a ranging method, a control method for an image processor, or a control method for a three-dimensional measurement system including at least part of the above processes, or may be directed to a program for implementing any of these methods or a non-transitory storage medium storing the program. The above elements and processes may be combined with one another in any possible manner to form one or more aspects of the present invention.

Advantageous Effects

The measurement using stereo matching according to the above aspects of the present invention achieves high-accuracy and high-speed processing.

BRIEF DESCRIPTION OF THE DRAWINGS

FIGS. 14A to 14D are diagrams of other example combined patterns.

FIGS. 16A and 16B are diagrams of other example combined patterns.

DETAILED DESCRIPTION

<Example Use>

Figure 1:
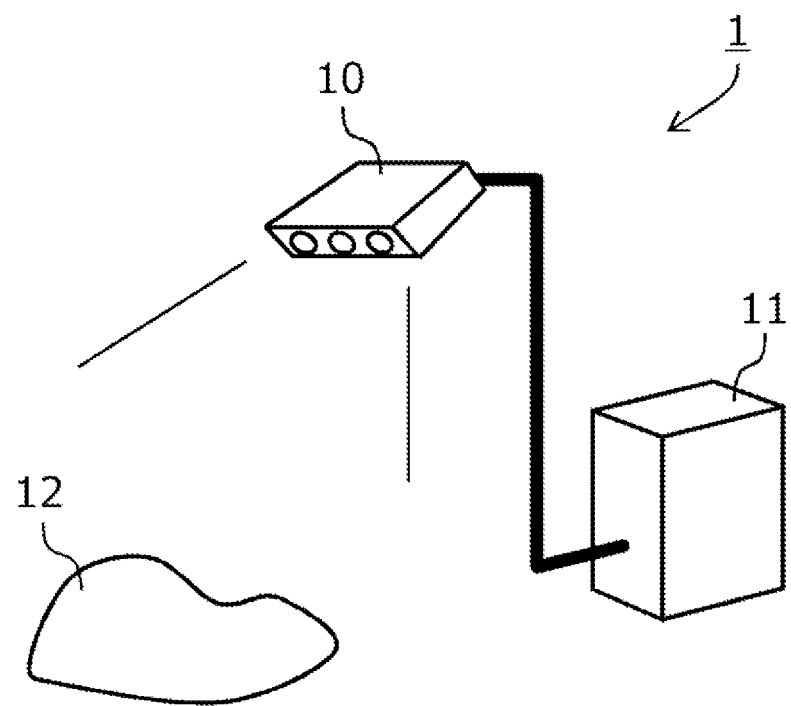
FIG. 1 is a schematic diagram of a 3D measurement system as an example use of the present invention.

FIG. 1 is a schematic diagram of a three-dimensional (3D) measurement system as an example use of the present invention. A 3D measurement system 1 measures the 3D shape of a target object 12 by image sensing. The 3D measurement system 1 mainly includes a sensor unit 10 and an image processor 11. The sensor unit 10 includes at least a projector for projecting patterned light and one or more cameras (also referred to as image sensing devices or imaging devices). The sensor unit 10 may also include another sensor or an illuminator as appropriate. The output from the sensor unit 10 is received by the image processor 11. The image processor 11 uses data received from the sensor unit 10 to perform various processes. The processes performed by the image processor 11 may include distance measurement (ranging), 3D shape recognition, object recognition, and scene recognition. The processing results from the image processor 11 are output to an output device, such as a display, or transferred to an external device to be used for inspection or control over another device. The 3D measurement system 1 has many applications including computer vision, robot vision, and machine vision.

The structure shown in FIG. 1 is a mere example. The 3D measurement system 1 may have a hardware configuration designed as appropriate for its use. For example, the sensor unit 10 and the image processor 11 may be wirelessly connected to or integral with each other. The sensor unit 10 and the image processor 11 may be connected to each other through a local area network (LAN) or a wide area network (WAN) such as the Internet. Multiple sensor units 10 may be included for one image processor 11, or the output from one sensor unit 10 may be provided to multiple image processors 11. The sensor unit 10 may be attached to a robot or a movable object to have a movable viewpoint.

Figure 2:
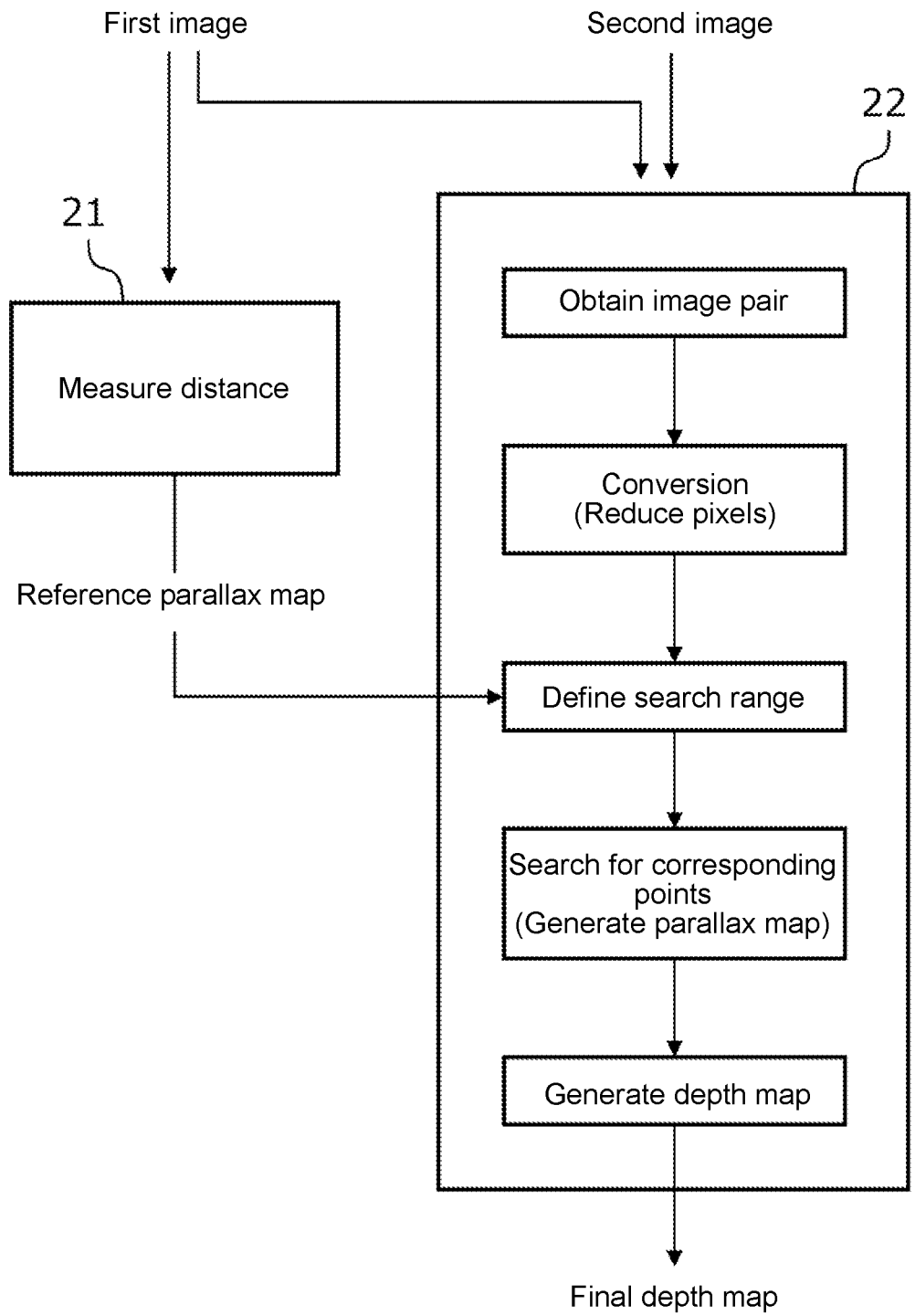
FIG. 2 is a schematic diagram of the 3D measurement system showing the functions and processes.

FIG. 2 is a schematic diagram of the 3D measurement system 1 showing the functions and processes. The 3D measurement system 1 includes two measurement sections, or a first measurement section 21 and a second measurement section 22, for measuring the distance from the target object 12. The measurement sections 21 and 22 have functions and processes implementable through cooperation between the sensor unit 10 and the image processor 11.

The first measurement section 21 is a first ranging unit for measuring the depth to the target object 12 with a spatially encoded pattern technique. The second measurement section 22 is a second ranging unit for measuring the depth to the target object 12 with stereo matching (also referred to as a stereo camera technique). For a first measurement section 21 and a second measurement section 22 using the same cameras (or in other words, images with the same resolution), the distance information (second depth information) obtained with stereo matching has a higher spatial resolution than the distance information (first depth information) obtained with the spatially encoded pattern technique. The system 1 thus uses distance information obtained by the first measurement section 21 as an aid to roughly predict parallax to be measured with the second measurement section 22 and narrow the search range for stereo matching. The system 1 then uses distance information generated by the second measurement section 22 as a final output.

Figure 3:
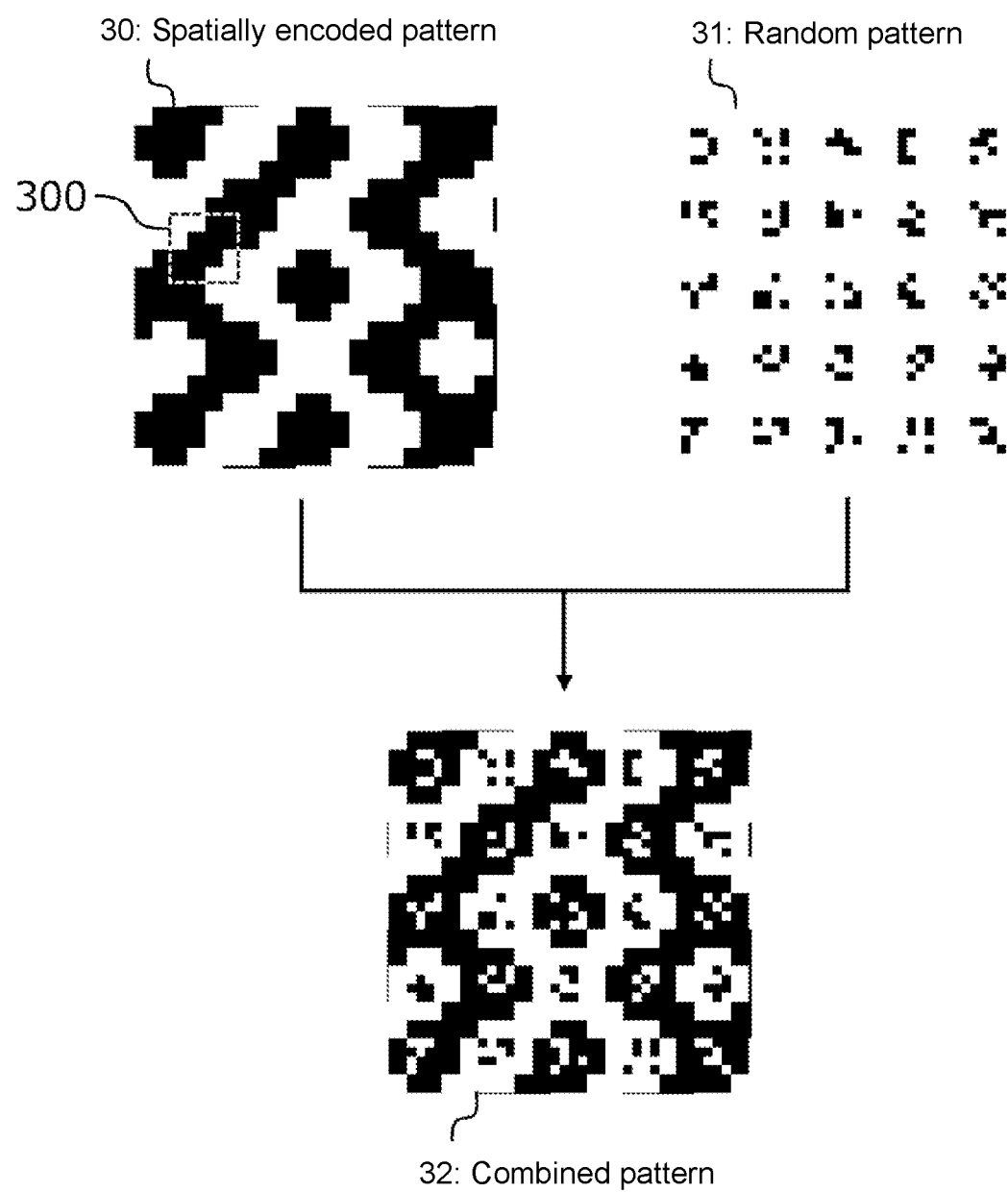
FIG. 3 is a diagram of an example combined pattern combining a spatially encoded pattern and a random pattern.

The measurement process performed by the 3D measurement system 1 will now be roughly described with reference to FIGS. 2 and 3.

(1) The sensor unit 10 projects patterned light from the projector to the target object 12. As shown in FIG. 3, the system 1 uses a combined pattern 32 combining a spatially encoded pattern 30 and a random pattern 31. The spatially encoded pattern 30 is used for distance measurement with a spatially encoded pattern technique. The spatially encoded pattern 30 includes unit elements 300 having a predetermined size arranged regularly. Each unit element 300 is the minimum area corresponding to one depth value. The random pattern 31 includes multiple small pieces (referred to as random pieces) arranged randomly.

(2) The sensor unit 10 images the target object 12 while projecting patterned light onto the target object 12 to obtain a pair of stereo images (referred to as a first image and a second image). The two images are produced by capturing the target object 12 from different viewpoints (gaze directions) to generate parallax for the target object 12. For a sensor unit 10 including two or more cameras, the first and second images may be simultaneously captured with two cameras. In some embodiments, the first and second images may be obtained with a single camera moving to sequentially capture images.

(3) The first measurement section 21 obtains first depth information about the target object 12 using the first image with the spatially encoded pattern technique. The first measurement section 21 predicts parallax between the first and second images based on the first depth information and outputs the two-dimensional (2D) spatial distribution of the predicted parallax as a parallax map. The parallax map generated by the first measurement section 21 is herein referred to as a reference parallax map for distinction from a parallax map generated by the second measurement section 22 with stereo matching. The first depth information and the reference parallax map have a spatial resolution that depends on the size of the unit element 300 in the spatially encoded pattern 30. For a unit element 300 having a size of 4×4 pixels in the first image, for example, the first depth information and the reference parallax map have a spatial resolution of ¼ of the resolution of the first image.

(4) The second measurement section 22 defines search ranges for corresponding points for stereo matching using the reference parallax map obtained from the first measurement section 21. The predicted parallax unavoidably includes errors to some degree, and the search ranges for corresponding points may be defined to reflect the errors. For example, the search range may be defined as d−derr−c to d+derr+c, where d (pixels) is the value of the predicted parallax, ±derr (pixels) is the error, and c is the margin. The search ranges may be separately defined for all the pixels in an image. For an image with small local variations in parallax, the image may be divided into multiple areas, and a search range may be defined for each area.

(5) The second measurement section 22 searches the defined search ranges for corresponding points of pixels between the first and second images. For example, the first image may be used as a reference image, and the second image may be used as a comparative image. For a pixel (reference point) in the first image, a pixel in the second image having an image feature closest to that of the reference point is selected as a corresponding point. The difference in coordinates between the reference point and the corresponding point is determined to be parallax at the reference point. The search for a corresponding point is performed for all the pixels in the first image. The search results are used to generate a parallax map. The parallax map is a set of data including the coordinates of the pixels each associated with parallax information.

(6) The second measurement section 22 converts the parallax information in the parallax map into distance information using the principle of triangulation to generate a depth map (second depth information). The second depth information obtained by the second measurement section 22 has a spatial resolution that depends on the resolution of the first and second images. The second measurement section 22 thus obtains depth information having a higher spatial resolution than the first measurement section 21.

In typical known stereo matching, the entire comparative image is searched for corresponding points. Thus, high-resolution images unavoidably cause long time processing. In contrast, the above structure limits the search ranges for corresponding points based on predicted parallax. This greatly narrows the search ranges and shortens the time taken for the search for corresponding points. Patterned light with a combined random pattern increases the complexity of the contrast distribution (the variety of image features) on the surface of a target object. This increases the success rate and the accuracy of stereo matching, or specifically the search for corresponding points. The system 1 thus allows high-speed and accurate 3D measurement with high spatial resolution.

<Explanation of Patterned Light>

The combined pattern 32 in FIG. 3 will now be described in detail. The combined pattern 32 results from superimposing (combining) the random pattern 31 on the underlying, spatially encoded pattern 30. The combined pattern 32 may be projected from one projector. In some embodiments, the spatially encoded pattern 30 and the random pattern 31 may be separately projected from two projectors and superimposed on the surface of the target object. In FIG. 3 and other figures, the patterns are shown in white and black, with white representing bright portions (with light illumination) and black representing dark portions (without light illumination). The patterns are not limited to binary patterns with white and black (light and dark) but may be multileveled.

(Spatially Encoded Pattern)

Figure 4:
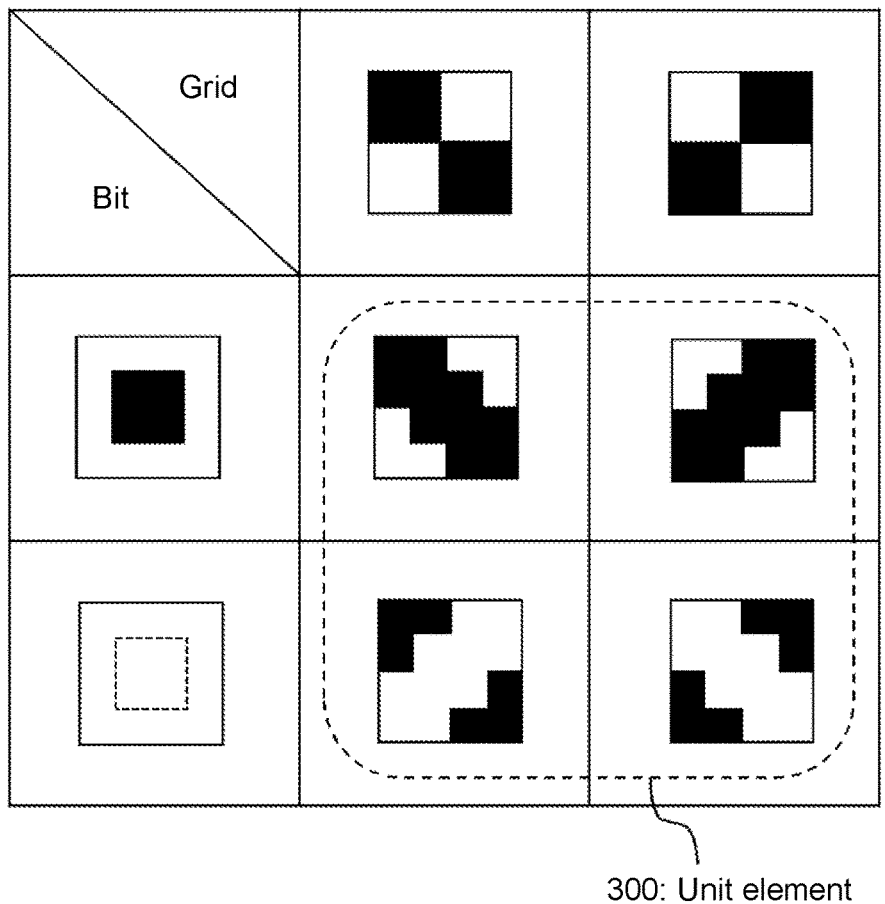
FIG. 4 is a diagram of example unit elements included in the spatially encoded pattern.

FIG. 4 shows example unit elements 300 included in the spatially encoded pattern 30. Each unit element 300 is the minimum area corresponding to one depth value and is also referred to as a primitive. Each unit element 300 shown in FIG. 4 includes a 2×2 grid with a rectangle referred to as a bit located at the center. The grid can be one of two types. The bit can be one of two types. Each unit element 300 can thus have any of four values with combinations of grids and bits.

(Random Pattern)

The random pattern 31 includes multiple random pieces that are arranged randomly. The random arrangement may be fully random with no regularity or repeatability, or may be determined using pseudorandom numbers. Each random piece includes one dot (pixel) or multiple continuous dots (pixels). The random pieces may have fixed or varying shapes and sizes and may be of one type or may be of one of multiple types. One or more random pieces may be added into the area in the unit element 300. Each random piece may have a luminance level or a color to be distinguishable from the subelement (bit and grid) in the unit element 300. In the example shown in FIG. 3, each random piece may have the luminance level set to have light and dark (white and black) inverted from those of the subelement in the unit element 300.

Adding the random pattern 31 may increase the success rate and the accuracy of stereo matching as compared with projecting the spatially encoded pattern 30 alone. The spatially encoded pattern 30 alone may cause a regular contrast distribution to appear on the surface of the target object, possibly causing selection of incorrect corresponding points in the search for corresponding points. Adding the random pattern 31 increases the complexity of the contrast distribution (the variety of image features) to facilitate detection of correct corresponding points. The effect is noticeable under a low-contrast condition that may cause the surface of the target object to have unclear image features.

(Added Amount of Random Pattern Pieces)

Figure 5:
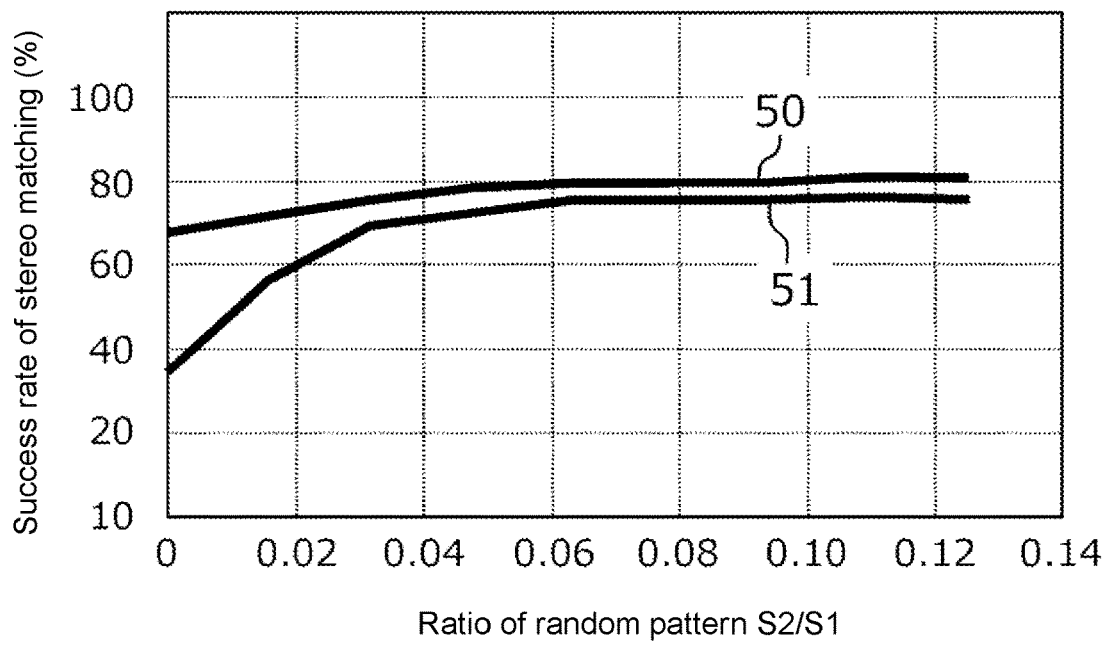
FIG. 5 is a graph showing changes in the success rate of stereo matching under a low-contrast condition with varying added amounts of random pattern pieces.

FIG. 5 shows changes in the success rate of stereo matching under a low-contrast condition with varying added amounts of random pattern pieces. The horizontal axis indicates the ratio of the random pattern 31 to the spatially encoded pattern 30. The vertical axis indicates the success rate of stereo matching (the success rate of the search for corresponding points).

Figure 6:
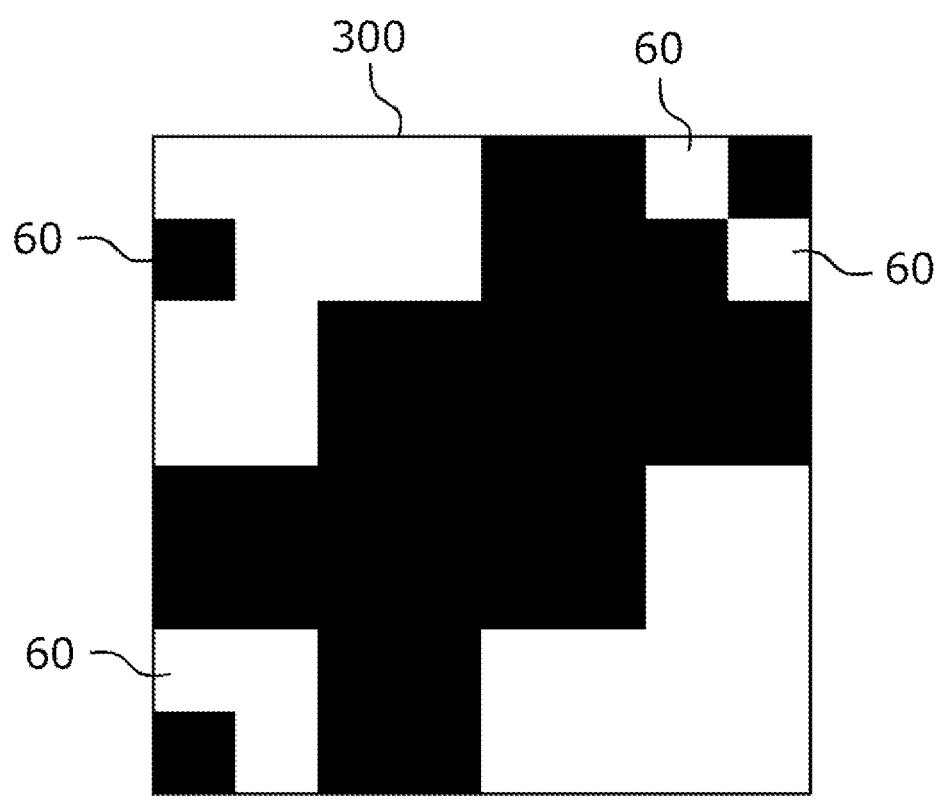
FIG. 6 is an example unit element with a combined random pattern.

The ratio of the random pattern 31 to the spatially encoded pattern 30 is herein indicated by an index S2/S1, where S1 is the area size of the unit element 300 in the spatially encoded pattern 30, and S2 is the total area size of random pieces added into the area in the unit element 300. In the example shown in FIG. 6, the unit element 300 is a square having 64 pixels (8×8 pixels) with addition of four random pieces 60 (three one-pixel random pieces and one three-pixel random piece). Thus, S1=64, S2=6, and S2/S1=0.09375.

Figure 7A:
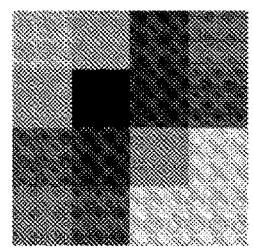
FIGS. 7A and 7B are simulated images each obtained by projecting the unit element in FIG. 6 onto a target object and imaging the target object under a low-contrast condition.
Figure 7B:
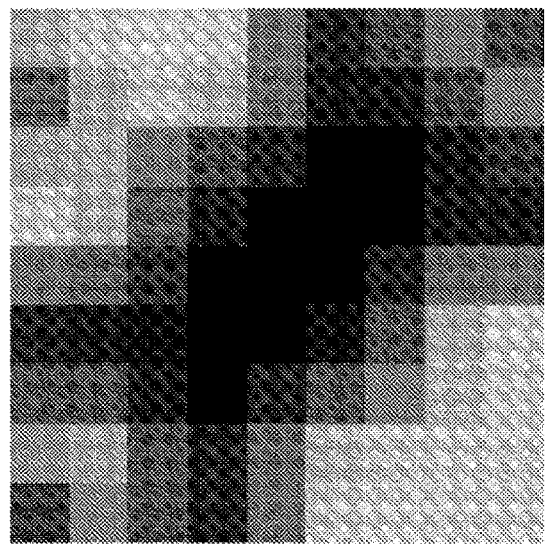

A line 50 in FIG. 5 shows the results of experiments conducted with a camera set to form an image of the unit element 300 having a size of 4×4 pixels on an image sensor. Aline 51 shows the results of experiments conducted with a camera set to form an image of the unit element 300 having a size of 10×10 pixels on an image sensor. The image size of the unit element 300 may be set as intended by adjusting the magnification of the projector, the magnification of camera lenses, and the layout of the projector and the cameras (the distances from the target object). FIGS. 7A and 7B each show a simulated image obtained by projecting the unit element 300 in FIG. 6 onto a target object and imaging the target object under a low-contrast condition. FIG. 7A shows an image with a size of 4×4 pixels. FIG. 7B shows an image with a size of 10×10 pixels.

As indicated by the lines 50 and 51 in FIG. 5, the success rate of stereo matching is the lowest with no random pattern added (S2/S1=0) and increases as the added amount of random pattern pieces increases. Experiments conducted by the inventors reveal that the added amount (ratio S2/S1) of random pattern pieces may be greater than 0.02, and more specifically greater than 0.04.

Figure 8:
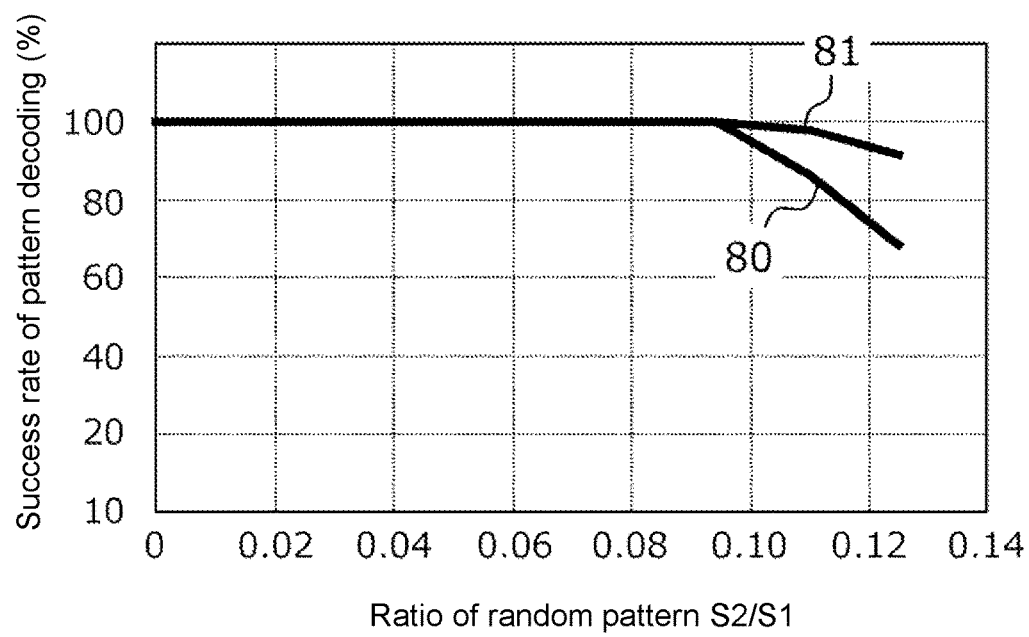
FIG. 8 is a graph showing changes in the success rate of pattern decoding with a spatially encoded pattern technique under a low-contrast condition with varying added amounts of random pattern pieces.

FIG. 8 shows changes in the success rate of pattern decoding with the spatially encoded pattern technique under a low-contrast condition with varying added amounts of random pattern pieces. The horizontal axis indicates the ratio of the random pattern 31 to the spatially encoded pattern 30. The vertical axis indicates the success rate of pattern decoding. A line 80 in FIG. 8 shows the results of experiments conducted with a camera set to form an image of the unit element 300 having a size of 4×4 pixels on an image sensor. A line 81 shows the results of experiments conducted with a camera set to form an image of the unit element 300 having a size of 10×10 pixels on an image sensor.

As indicated by the lines 80 and 81 in FIG. 8, the success rate of pattern decoding is the highest with no random pattern added (S2/S1=0) and sharply decreases when the added amount of random pattern pieces exceeds a threshold. At a lower success rate of pattern decoding, fewer points can be used for calculating depth, or in other words, for predicting parallax. This reduces points for which their corresponding points can be searched for within limited ranges, thus increasing the processing time for stereo matching. Experiments conducted by the inventors reveal that the added amount of random pattern pieces (ratio S2/S1) may be less than 0.12, and more specifically less than 0.1.

The added amount of random pattern pieces, or the ratio S2/S1, may satisfy at least 0.02<S2/S1<0.12.

Using this range allows processing that balances the success rate and the processing time for stereo matching.

The added amount of random pattern pieces, or the ratio S2/S1, may further satisfy 0.04<S2/S1<0.1.

Using this range substantially maximizes the success rate of stereo matching and the success rate of pattern decoding. In other words, this substantially maximizes the accuracy and the speed of stereo matching.

(Size of Random Pattern)

The size of the random pattern may be set small enough to avoid changing the subelement in the spatially encoded pattern. Changing the subelement refers to producing an incorrect value in response to pattern decoding from images captured with the cameras, or failing to decoding.

For a binary pattern with white and black as in the present embodiment, for example, the size of the random pattern may be set to satisfy S4<S3/2, where S3 is the area size of the smallest subelement (e.g., bit and grid) representing the value of the unit element 300, and S4 is the area size of the largest random piece added into the unit element 300.

Figure 9A:
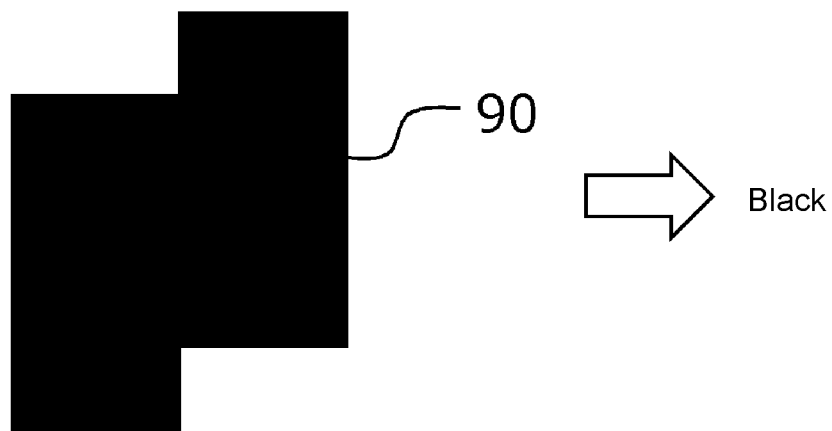
FIGS. 9A to 9C are diagrams of example black subelement on which a white random piece is superimposed.
Figure 9B:
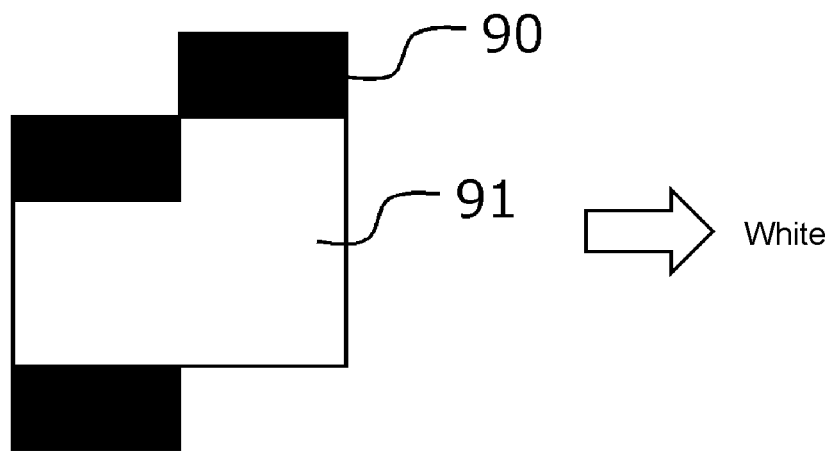
Figure 9C:
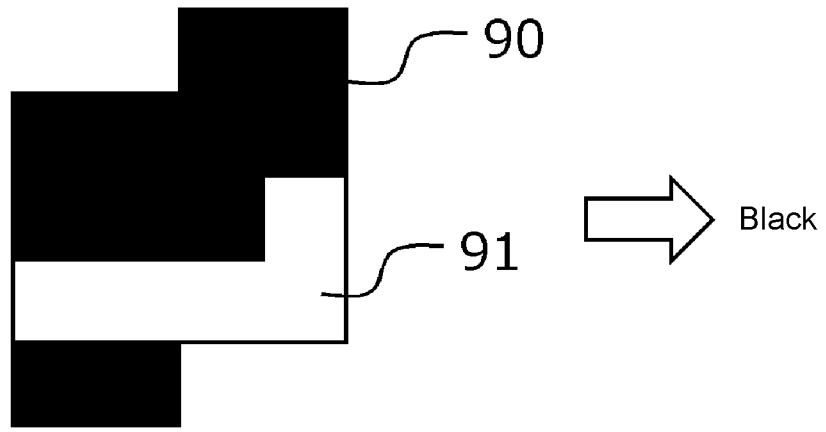

FIGS. 9A to 9C show an example black subelement 90 on which a white random piece 91 is superimposed. FIG. 9A shows an example subelement 90. For a random piece 91 occupying half or more of the area size of the subelement 90 as shown in FIG. 9B (S4≥S3/2), the subelement 90 with the larger white area size is to be black but is erroneously determined to be white. For a random piece 91 occupying less than half the area size of the subelement 90 as shown in FIG. 9C (S4<S3/2), the subelement 90 with the larger black area size is correctly determined to be black when the random piece 91 is superimposed on the subelement 90.

(Image Size)

Experiments conducted by the inventors reveal that the image size of the unit element 300 may be 3×3 pixels or greater. For a unit element 300 having fewer than three pixels on each side, the subelement (bit and grid) in the unit element 300 may fail to be resolved and cannot be correctly determined to be light or dark (white or black), greatly reducing the pattern decoding rate. To improve the pattern decoding rate, the image size of the unit element 300 may be greater. However, a greater image size causes a lower spatial resolution of depth information to be obtained with the spatially encoded pattern technique. Thus, the image size may practically be 3×3 to 10×10 pixels.

The image size of the subelement in the unit element 300 may be 3/2×3/2 pixels or greater. A subelement having fewer than 3/2 pixels on each side (e.g., for an image of a subelement extending over two pixels) may fail to be resolved sufficiently and cannot be correctly determined to be light or dark (white or black), reducing the pattern decoding rate. The subelement has a size with an upper limit that depends on the relationship with the size of the unit element 300. For example, S3≤S¼ may be satisfied, where S1 is the area size of the unit element 300, and S3 is the area size of the subelement.

Figure 10:
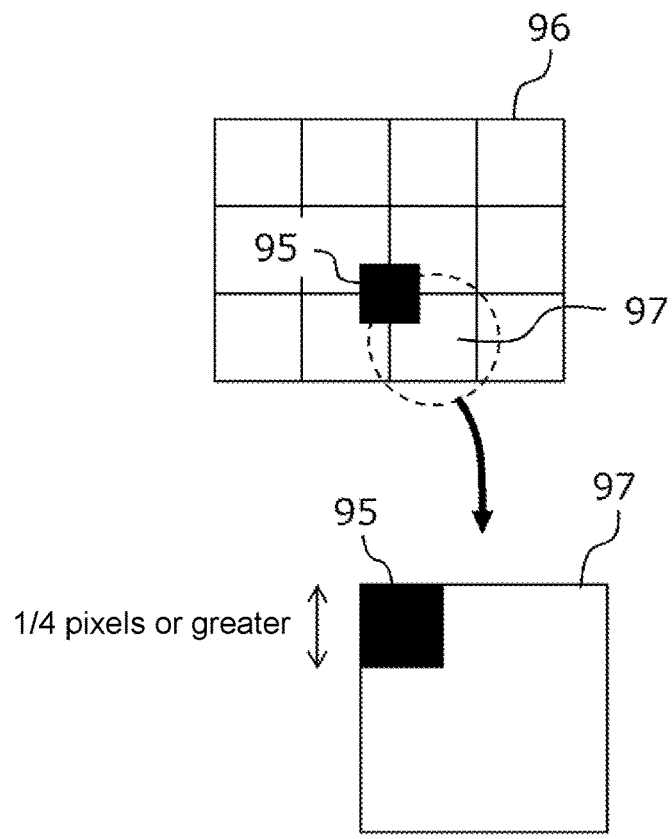
FIG. 10 is a diagram of a random pattern with the lowest contrast.

The image size of the random piece may be ¼×¼ pixels or greater. To image the random pattern at signal values to be recognizable on an image, the difference in the signal value may be at least two digits between each random piece and pixels adjacent to the random piece. As shown in FIG. 10, the pattern has the smallest contrast (or in other words, the effect of the pattern is likely to be reduced) when a random piece 95 extends over pixels of an image sensor 96. For example, a camera may output signal values with eight bits (=256 digits), and white pixels may have a signal value of 128 digits. In this case, a portion of the random piece 95 included in a pixel 97 is to have an area size equivalent to 1/64 pixels or greater. To achieve this, the random piece 95 is to have a size of 1/16 pixels (=¼×¼ pixels) or greater on the image sensor 96. Example image sizes have been described above for a camera having an 8-bit output. However, the image size may be set as appropriate for the specifications or performance of the camera (image sensor) to allow a recognizable difference in the signal value between each random piece and pixels adjacent to the random piece.

(Other Patterns)

Figure 11A:
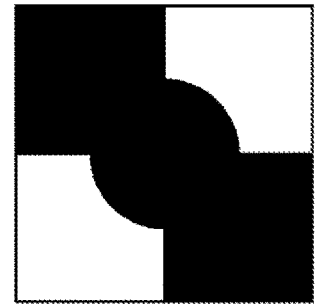
FIGS. 11A and 11B are diagrams of other example combined patterns.
Figure 11B:
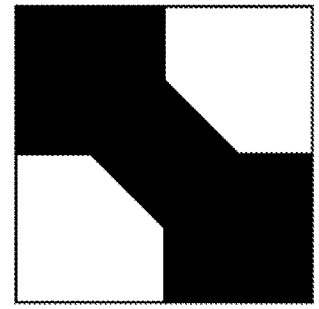

Other examples of the combined pattern will now be described. FIG. 11A shows an example with a circular bit. FIG. 11B is an example with a rhombic bit (the grid in each figure has the same shape as that in the example shown in FIG. 3). For each example, the same random pattern as described above may be added. The bit may have any shape other than square, circular, and rhombic.

Figure 12A:
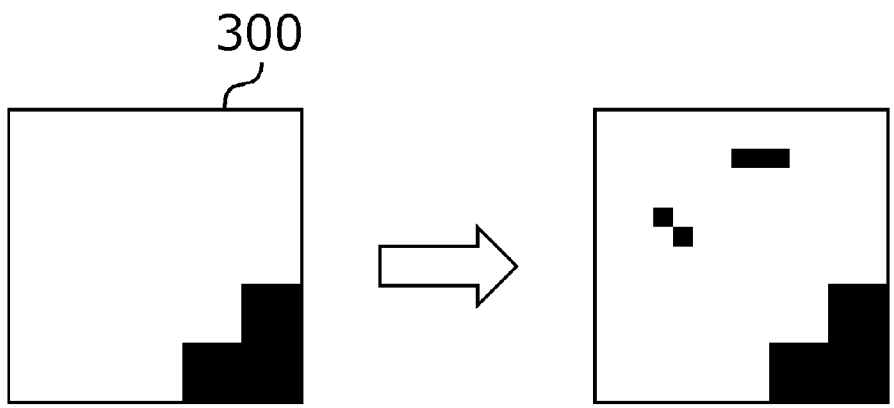
FIGS. 12A to 12D are diagrams of other example combined patterns.
Figure 12B:
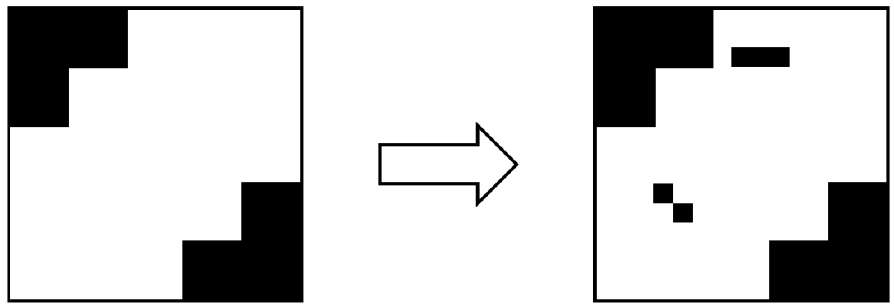
Figure 12C:
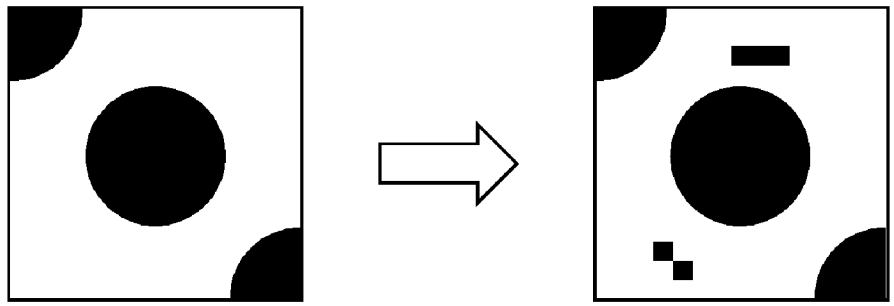
Figure 12D:
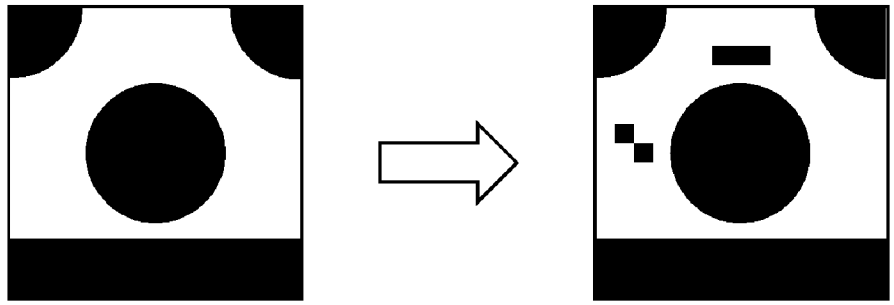

FIGS. 12A to 12D show unit elements 300 including different numbers of subelements. FIG. 12A shows an example with one subelement. FIG. 12B shows an example with two subelements. FIG. 12C shows an example with three subelements. FIG. 12D shows an example with four subelements. In each figure, the left part shows a unit element 300 in a spatially encoded pattern, and the right part shows a combined pattern with a random pattern added. The random pattern may be added with the method described above.

Figure 13A:
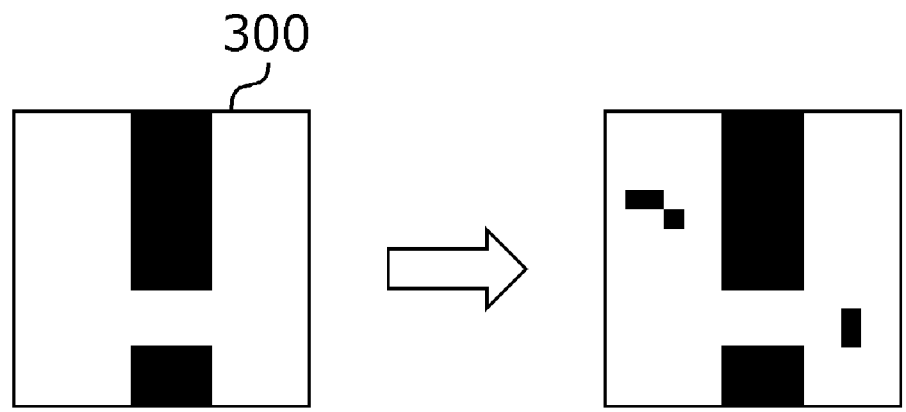
FIGS. 13A to 13D are diagrams of other example combined patterns.
Figure 13B:
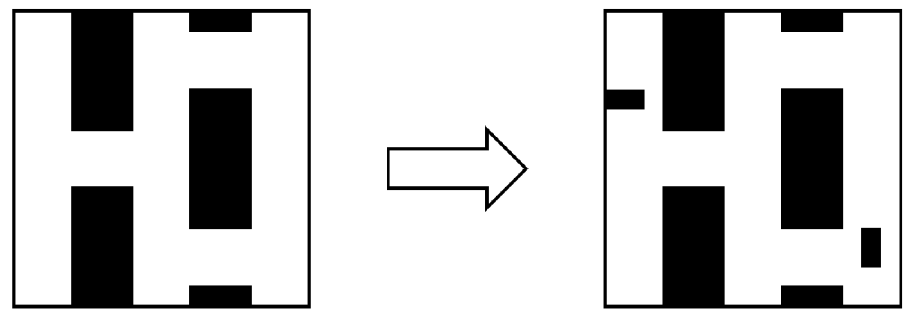
Figure 13C:
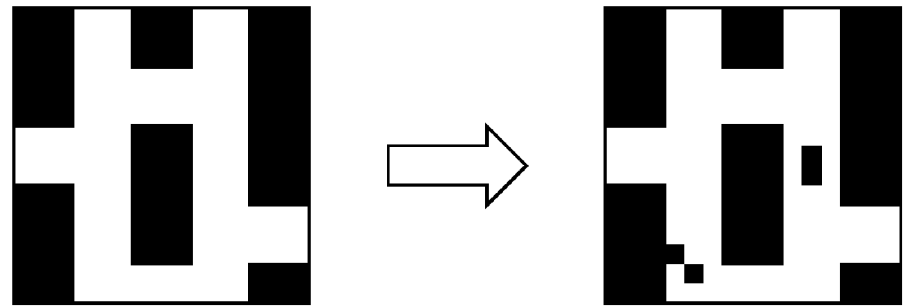
Figure 13D:
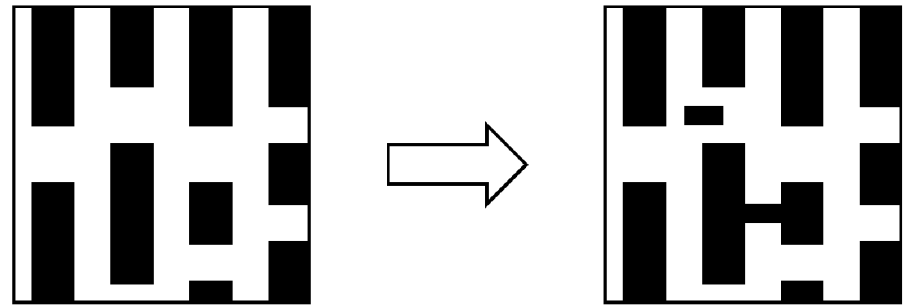

FIGS. 13A to 13D show example patterns using lines (e.g., dashed or dotted lines). FIG. 13A shows an example with one line. FIG. 13B shows an example with two lines. FIG. 13C shows an example with three lines. FIG. 13D shows an example with four lines. In each figure, the left part shows a unit element 300 in a spatially encoded pattern, and the right part shows a combined pattern with a random pattern added. The random pattern may be added with the method described above.

FIGS. 14A to 14D show example patterns using grids. FIG. 14A shows an example with one grid line. FIG. 14B shows an example with two grid lines. FIG. 14C shows an example with three grid lines. FIG. 14D shows an example with four grid lines. In each figure, the left part shows a unit element 300 in a spatially encoded pattern, and the right part shows a combined pattern with a random pattern added. The random pattern may be added with the method described above.

In FIGS. 12A to 12D, 13A to 13D, and 14A to 14D, random pieces are added into an area (also referred to as a background area) other than the area in which subelements are located. This arrangement reduces the likelihood that random pieces affect pattern decoding. Random pieces may be superimposed on subelements as in the examples described above.

Figure 15A:
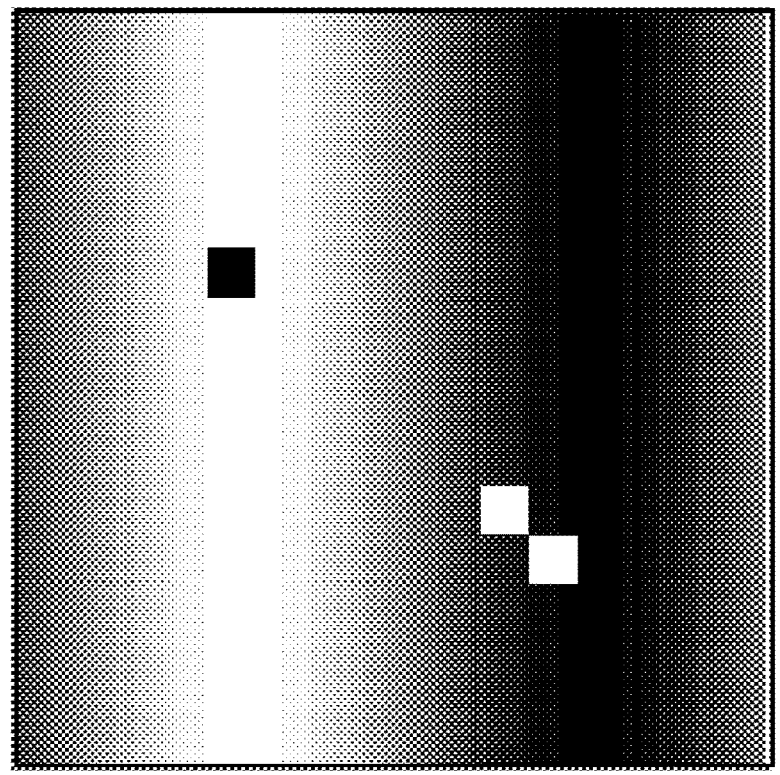
FIGS. 15A and 15B are diagrams of other example combined patterns.

FIG. 15A shows an example pattern using shading. This pattern includes one cycle of change in luminance. The value is represented by the phase of the change in luminance. Random pieces may be added to any positions in the unit element. In an image captured with a camera, each random piece is to be distinguishable from the luminance change pattern adjacent to the random piece. Thus, each random piece may have the luminance level set to have a contrast of at least two digits from the area adjacent to the random piece.

Figure 15B:
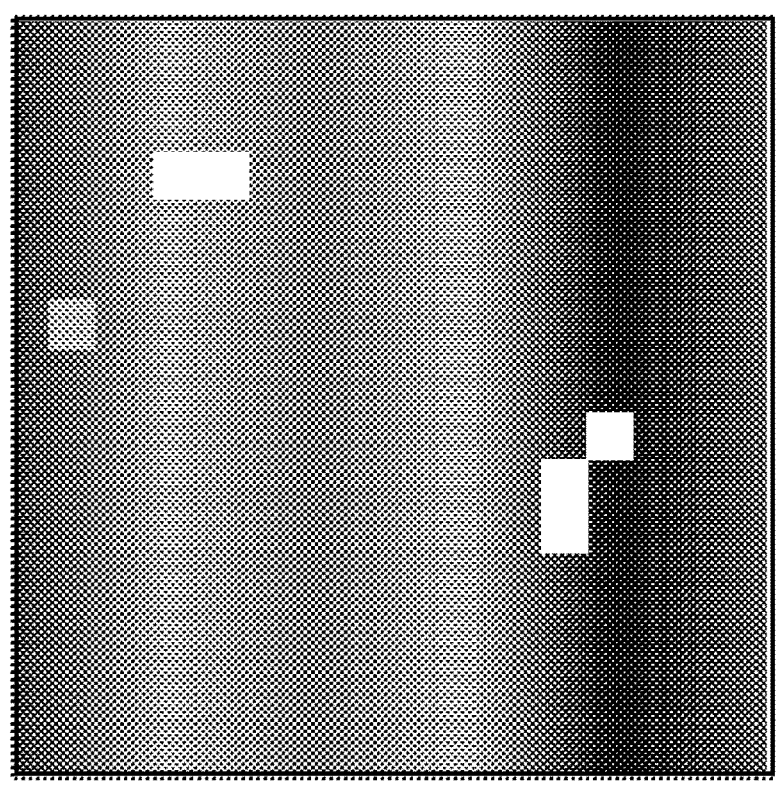

FIG. 15B shows an example pattern using wavelengths (colors). Although FIG. 15B is shown in monochrome, the pattern is actually colorful. This pattern includes one cycle of change in wavelengths. The value is represented by the phase of the change in wavelengths. Random pieces may be added to any positions in the unit element. In an image captured with a camera, each random piece is to be distinguishable from the wavelength change pattern adjacent to the random piece. Thus, each random piece may have the luminance level set to have a contrast of at least two digits from the area adjacent to the random piece. In some embodiments, each random piece may have the wavelength (color) set to have a predetermined wavelength difference.

FIG. 16A shows an example pattern using polarization. This pattern is a combination of vertical linearly polarized light 160 and horizontal linearly polarized light 161, instead of light and dark (white and black). For example, a pattern shown in FIG. 16A may be imaged with a camera including a polarizer 162 that transmits vertical linearly polarized light to produce an image shown in FIG. 16B. More specifically, the vertical polarization component is transmitted to form white pixels on the image, and the horizontal polarization component is cut to form black pixels on the image. For adding a random pattern, each random piece may have the polarization direction set to be different from the polarization direction of the area adjacent to the random piece.

Embodiments

Figure 17:
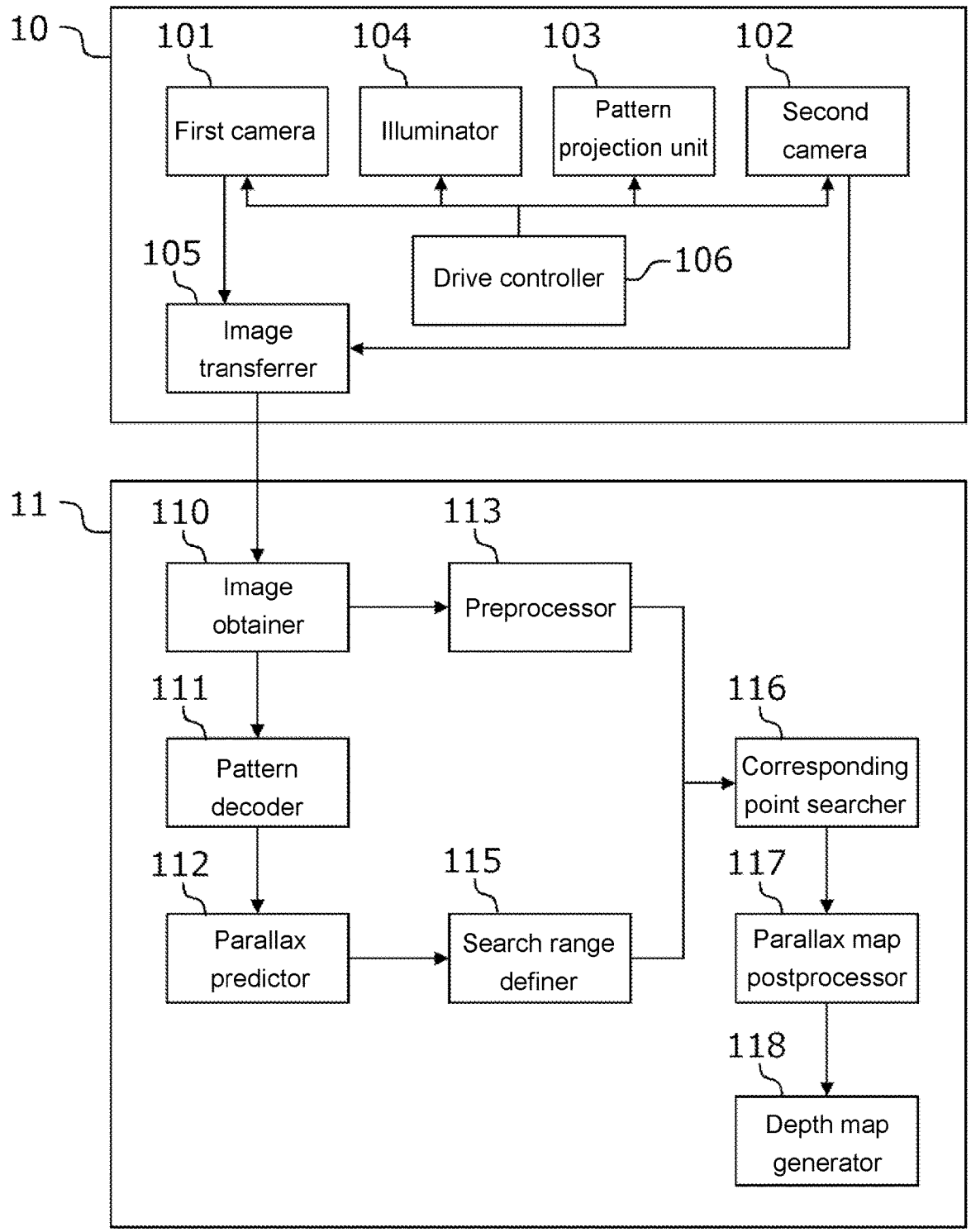
FIG. 17 is a functional block diagram of a 3D measurement system according to an embodiment of the present invention.

The 3D measurement system 1 according to an embodiment of the present invention will now be described with reference to FIG. 17. FIG. 17 is a functional block diagram of the 3D measurement system 1.
(Sensor Unit)

The sensor unit 10 includes a first camera 101, a second camera 102, a pattern projection unit 103, an illuminator 104, an image transferrer 105, and a drive controller 106.

The first camera 101 and the second camera 102 are paired to form a stereo camera and spaced from each other by a predetermined distance. The cameras 101 and 102 can simultaneously perform imaging to produce a pair of images captured from different viewpoints (the image captured by the first camera 101 is referred to as a first image, and the image captured by the second camera 102 is referred to as a second image). The cameras 101 and 102 may be arranged to have optical axes crossing each other and have horizontal (or vertical) lines flush with each other. This arrangement allows the epipolar line to be parallel to horizontal (or vertical) lines in images. Thus, a corresponding point can be searched for within a horizontal (or vertical) line at the corresponding position in stereo matching, simplifying the search process. The cameras 101 and 102 may be monochrome or color cameras.

Figure 18:
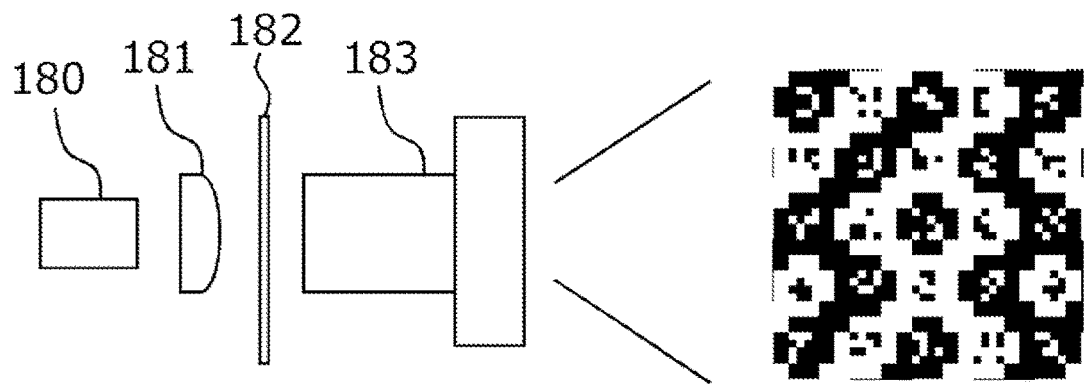
FIG. 18 is a diagram of an example pattern projection unit.

The pattern projection unit 103 is a projector for projecting patterned light onto the target object 12 for ranging with the spatially encoded pattern technique. FIG. 18 schematically shows an example of the pattern projection unit 103.

The pattern projection unit 103 includes, for example, a light source 180, a light guide lens 181, a pattern generator 182, and a projection lens 183. The light source 180 may include a light-emitting diode (LED), a laser, or a vertical-cavity surface-emitting laser (VCSEL). The light guide lens 181 is an optical element for guiding light from the light source 180 to the pattern generator 182 and may include a lens or a glass rod. The pattern generator 182 is a member or a device for generating a combined pattern and may include a photomask, a diffractive optical element (DOE), or an optical modulator such as digital light processing (DLP), a liquid crystal display (LCD), liquid crystal on silicon (LCoS), or microelectromechanical systems (MEMS). The projection lens 183 is an optical element for magnifying and projecting the generated pattern.

The illuminator 104 is a uniform illuminator usable for capturing typical visible light images. The illuminator 104 may be, for example, a white LED illuminator or an illuminator having the same wavelength band as active projection.

The image transferrer 105 transfers data about the first image captured with the first camera 101 and data about the second image captured with the second camera 102 to the image processor 11. The image transferrer 105 may transfer the first and second images as separate pieces of image data, or may transfer the first and second images as a single piece of image data by joining the first and second images into a side-by-side image. The drive controller 106 controls the first camera 101, the second camera 102, the pattern projection unit 103, and the illuminator 104. The image transferrer 105 and the drive controller 106 may be included in the image processor 11, rather than in the sensor unit 10.
(Image Processor)

The image processor 11 includes an image obtainer 110, a pattern decoder 111, a parallax predictor 112, a preprocessor 113, a search range definer 115, a corresponding point searcher 116, a parallax map postprocessor 117, and a depth map generator 118.

The image obtainer 110 receives image data to be used from the sensor unit 10. The image obtainer 110 transmits the first image to the pattern decoder 111 and transmits the first and second images or a pair of stereo images to the preprocessor 113.

The pattern decoder 111 obtains distance information (first depth information) from the first image with the spatially encoded pattern technique. With the spatially encoded pattern technique, the spatial resolution depends on the size of the unit element to be used. For a unit element with 5×5 pixels, for example, the distance information has a spatial resolution of ⅕ of an input image. The parallax predictor 112 predicts parallax between the first and second images based on the distance information obtained by the pattern decoder 111, and outputs a reference parallax map.

The preprocessor 113 performs preprocessing on the first and second images as appropriate. The search range definer 115 defines search ranges for corresponding points based on predicted parallax. The corresponding point searcher 116 searches for corresponding points between the first and second images and generates a parallax map (second depth information) based on the search results. The parallax map postprocessor 117 performs post-processing on the parallax map as appropriate. The depth map generator 118 converts parallax information in the parallax map into distance information to generate a depth map.

The image processor 11 is, for example, a computer including a central processing unit (CPU), a random-access memory (RAM), a nonvolatile storage (e.g., a hard disk drive, or a solid-state drive or SSD), an input device, and an output device. In this case, the CPU loads the program stored in the nonvolatile storage into the RAM and executes the program to implement various functions described above. The image processor 11 may have any other configuration. The above functions may be entirely or partly implemented by a dedicated circuit such as a field-programmable gate array (FPGA) or an application-specific integrated circuit (ASIC), or by cloud computing or distributed computing.

In the present example, the first camera 101, the pattern projection unit 103, the image transferrer 105, the image obtainer 110, the drive controller 106, the pattern decoder 111, and the parallax predictor 112 form the first measurement section 21 shown in FIG. 2. The first camera 101, the second camera 102, the pattern projection unit 103, the image transferrer 105, the drive controller 106, the preprocessor 113, the search range definer 115, the corresponding point searcher 116, the parallax map postprocessor 117, and the depth map generator 118 form the second measurement section 22 shown in FIG. 2.

(Measurement Process)

Figure 19:
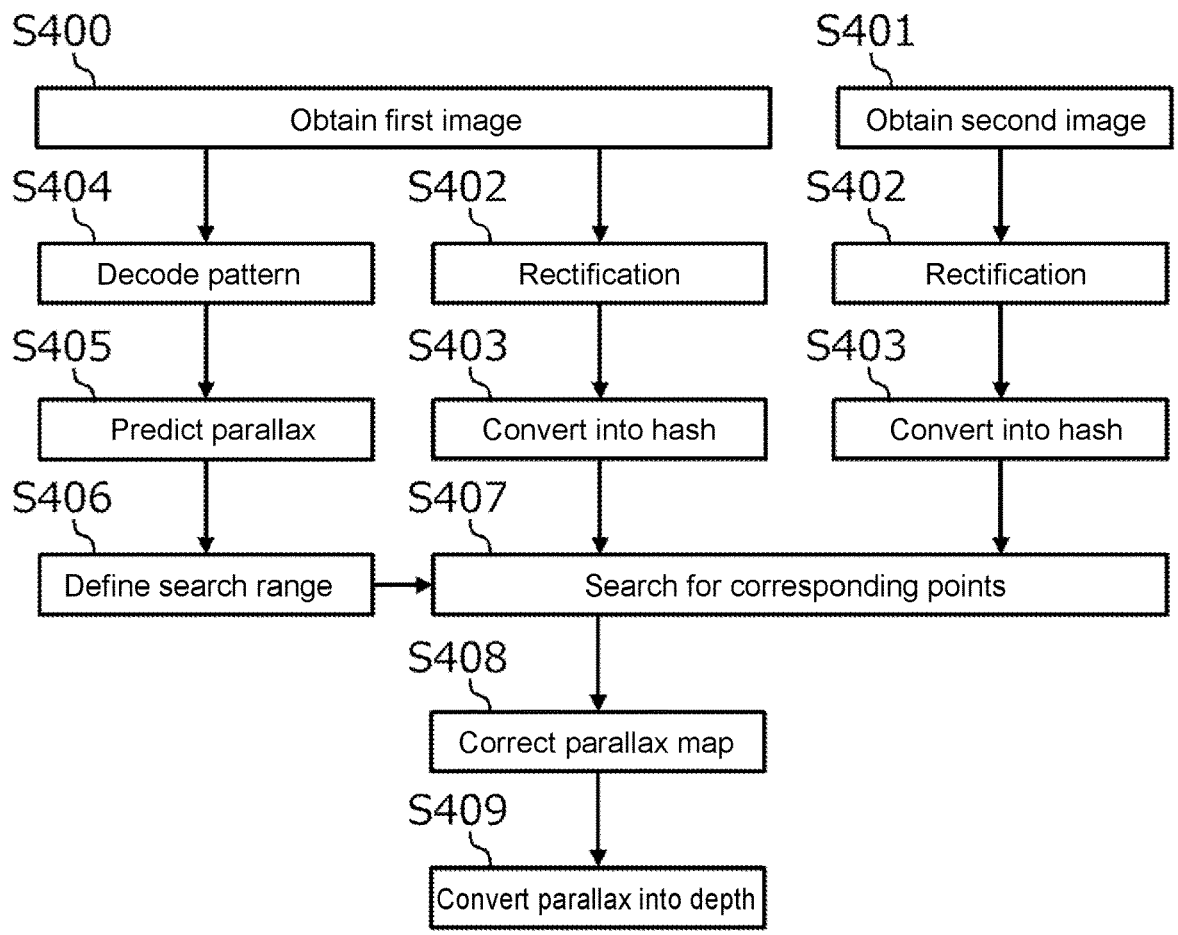
FIG. 19 is a flowchart showing a measurement process.

A measurement process according to the present embodiment will now be described with reference to FIG. 19. FIG. 19 is a flowchart showing a process performed by the image processor 11.

In steps S400 and S401, the image obtainer 110 obtains the first and second images from the sensor unit 10. The first and second images are respectively captured with the first and second cameras 101 and 102 with patterned light projected from the pattern projection unit 103 onto the target object 12. In response to receiving data about a side-by-side image from the sensor unit 10, the image obtainer 110 divides the side-by-side image into the first and second images. The image obtainer 110 transmits the first image to the pattern decoder 111 and transmits the first and second images to the preprocessor 113.

In step S402, the preprocessor 113 rectifies the first and second images (rectification). Rectification is a geometric transformation of either or both of the two images to cause corresponding points between the images to be located on the same horizontal (or vertical) line. Rectification causes the epipolar line to be parallel to horizontal (or vertical) lines in images, facilitating the search for corresponding points performed subsequently. For images received from the sensor unit 10 being parallel enough, the rectification in step S402 may be eliminated.

In Step S403, the preprocessor 113 calculates a hash feature quantity for each pixel in the rectified first and second images and replaces each pixel value with the corresponding hash feature quantity. The hash feature quantity represents the luminance feature of a local area at and around a target pixel and is indicated by an 8-bit string. Converting the luminance value of each pixel into a hash feature quantity allows efficient calculation of the degree of similarity in the local luminance feature in the search for corresponding points to be performed later.

In step S404, the pattern decoder 111 analyzes the first image and decodes the pattern to obtain distance information in the depth direction for multiple points on the first image.

In step S405, the parallax predictor 112 calculates 2D coordinates resulting from projection of a point onto an image coordinate system for the rectified first image, and calculates 2D coordinates resulting from projection of the same point onto an image coordinate system for the rectified second image, based on the distance information about the point obtained in step S405. The parallax predictor 112 then calculates the difference in coordinates between the two images. The difference is predicted parallax. The parallax predictor 112 determines predicted parallax for all the points for which distance information is obtained in step S404, and outputs the data as a reference parallax map.

In step S406, the search range definer 115 defines search ranges for corresponding points for the first and second images based on the predicted parallax. The search ranges are determined by reflecting prediction errors. For a prediction error being ±10 pixels, for example, a search range of about ±20 pixels around the predicted parallax may be enough with a margin included. For a horizontal line including 640 pixels, the search range narrowed to ±20 pixels (or in other words, 40 pixels) is simply 1/16 of the range for searching the entire horizontal line.

In step S407, the corresponding point searcher 116 searches for corresponding points between the first and second images after the pixel reduction and determines parallax for the pixels. The corresponding point searcher 116 generates parallax data including successfully detected corresponding points (the coordinates of pixels) each associated with parallax information. This information is a parallax map.

In step S408, the parallax map postprocessor 117 corrects the parallax map. The parallax map estimated through the search for corresponding points may include erroneously measured or omitted measured points. Such points are corrected or supplemented based on the parallax information about the adjacent pixels.

In step S409, the depth map generator 118 converts the parallax information about each pixel in the parallax map into 3D information (distance information in the depth direction) to generate a depth map. The depth map (a set of data about 3D points) is used for, for example, shape recognition or object recognition for the target object 12.

Modifications

The embodiments described above are mere examples of the present invention. The present invention is not limited to the embodiments described above, but may be modified variously within the scope of the technical ideas of the invention.

Figure 20:
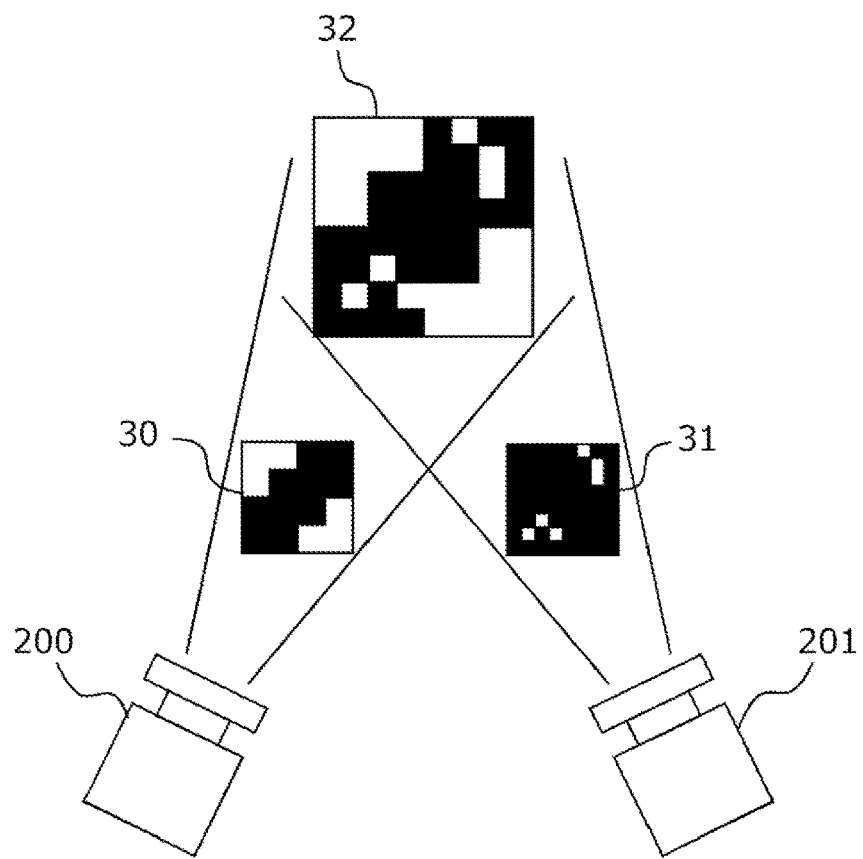
FIG. 20 is a diagram of another example pattern projection unit.

FIG. 20 shows another example pattern projection unit. The structure shown in FIG. 20 includes two pattern projection units, or more specifically, a pattern projection unit 200 for projecting a spatially encoded pattern 30 and a random pattern projection unit 201 for projecting a random pattern 31. The patterns 30 and 31 projected from the projection units 200 and 201 are superimposed on the surface of the target object to form a combined pattern 32. This structure produces the same effects as described in the embodiment described above.

Figure 21:
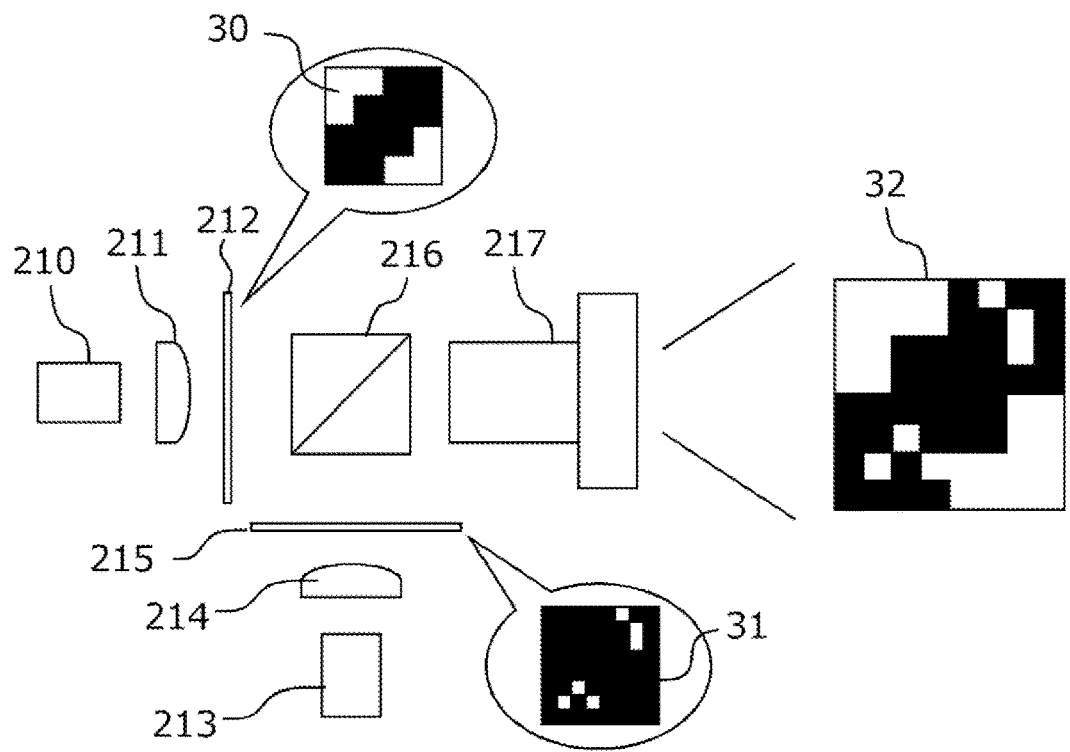
FIG. 21 is a diagram of another example pattern projection unit.

FIG. 21 shows another example pattern projection unit. The structure shown in FIG. 21 includes a light source 210, a light guide lens 211, and a pattern generator 212 for a spatially encoded pattern 30, and a light source 213, a light guide lens 214, and a pattern generator 215 for a random pattern 31. The two types of patterned light are combined with a beam combiner 216 into a combined pattern 32 to be projected from a projection lens 217. This structure produces the same effects as described in the embodiment described above.

Figure 22:
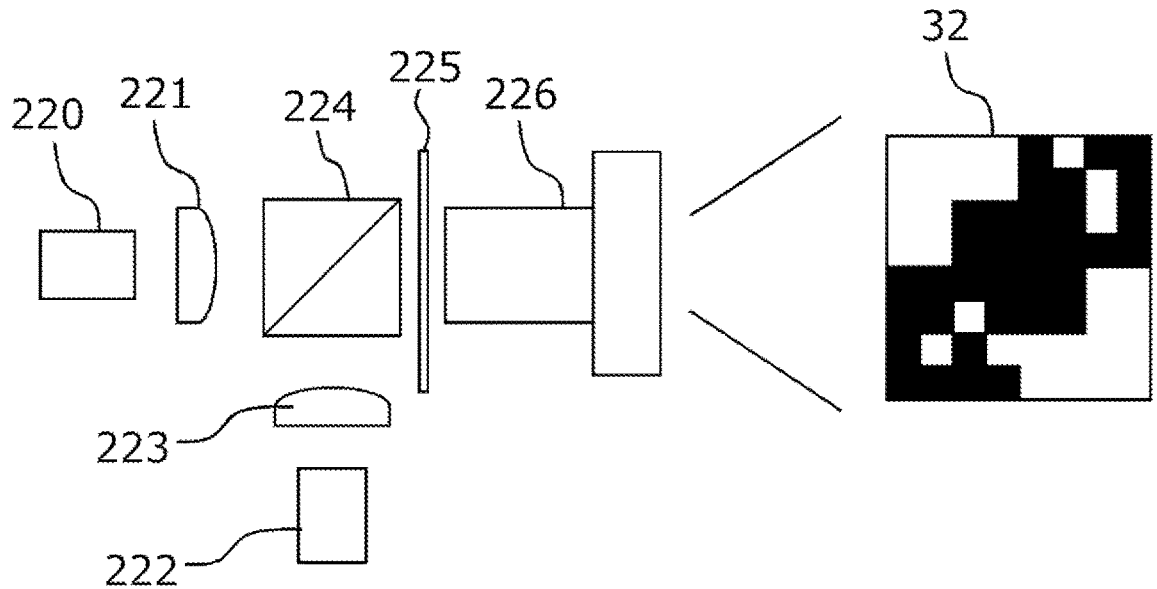
FIG. 22 is a diagram of another example pattern projection unit.
Figure 23:
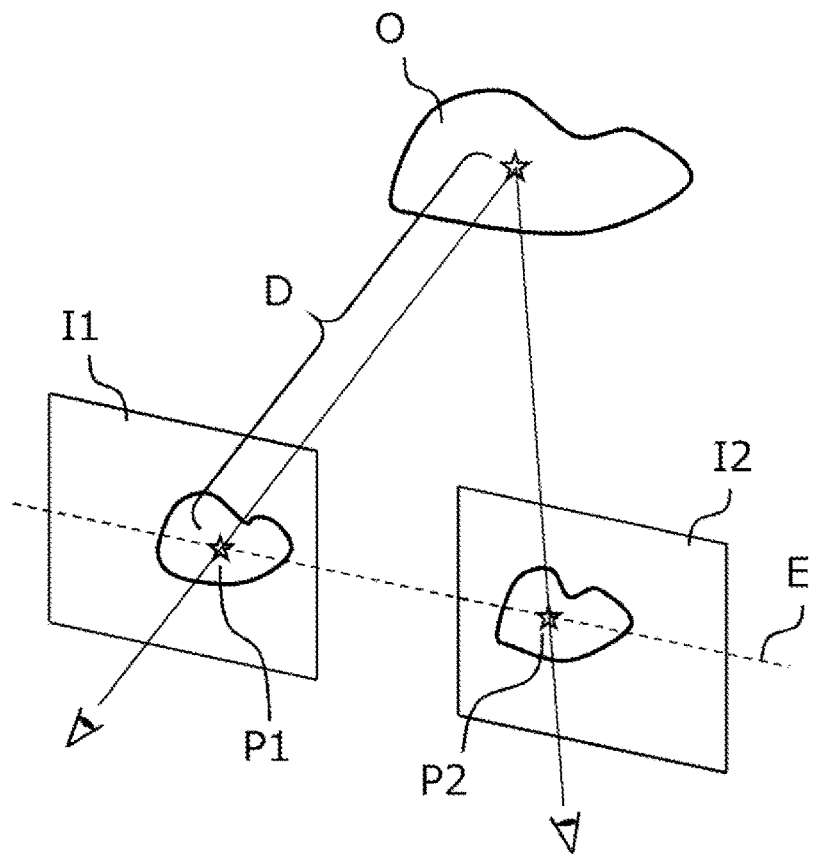
FIG. 23 is a diagram describing the principle of stereo matching.

FIG. 22 shows another example pattern projection unit. The structure shown in FIG. 22 includes a first light source 220, a first light guide lens 221, a second light source 222, and a second light guide lens 223. Two types of patterned light are combined with a beam combiner 224 into a combined pattern 32, which passes through a pattern generator 225 and is projected from a projection lens 226. The light sources 220 and 222 may have different wavelengths or polarization directions, for example.

In the above embodiments, the sensor unit includes two cameras, the first and second cameras. However, the sensor unit may include three or more cameras. Varying pairs of cameras may be used for stereo matching to produce multiple measurement results to allow more reliable measurement. This increases accuracy.

In the above embodiments, stereo matching uses hash feature quantities. However, any other method may be used for evaluating the degree of similarity in corresponding points. Example methods include using the sum of absolute differences (SAD) or sum of squared differences (SSD) as an evaluation index for the degree of similarity, and normalized correlation (NC) for calculating the degree of similarity in pixels in left and right images. In the above embodiments, the same camera images are used for generating the reference depth map (predicting parallax) and for stereo matching. However, different camera images for 3D measurement may be used for these processes.

APPENDIX (1) A three-dimensional measurement system (1), comprising:
a projector (103) configured to project patterned light onto a target object (12);
a first camera (101) configured to image the target object (12);
a second camera (102) configured to image the target object (12) from a viewpoint different from the first camera (101); and
an image processor (11) configured to process a first image received from the first camera (101) and a second image received from the second camera (102) to obtain three-dimensional information about the target object (12),
the image processor (11) including
  a first measurer (21, 111) configured to obtain first depth information using the first image with a spatially encoded pattern technique,
  a definer (115) configured to define a search range for a corresponding point for stereo matching based on parallax between the first image and the second image predicted from the first depth information, and
  a second measurer (22, 116) configured to obtain second depth information by performing stereo matching for the defined search range using the first image and the second image, the second depth information having a higher spatial resolution than the first depth information,
wherein the patterned light has a combined pattern (32) combining a spatially encoded pattern (30) and a random pattern (31), the spatially encoded pattern (30) includes a plurality of unit elements arranged regularly, each of the plurality of unit elements is an area corresponding to a depth value, and the random pattern (31) includes a plurality of random pieces arranged randomly.

REFERENCE SIGNS LIST 1 3D measurement system
10 sensor unit
11 image processor
12 target object
21 first measurement section
22 second measurement section

The invention claimed is:

1. A three-dimensional measurement system, comprising:
a projector configured to project patterned light onto a target object;
a first camera configured to image the target object;
a second camera configured to image the target object from a viewpoint different from the first camera; and
an image processor configured to process a first image received from the first camera and a second image received from the second camera to obtain three-dimensional information about the target object,
the image processor including
a first measurer configured to obtain first depth information using the first image with a spatially encoded pattern technique,
a definer configured to define a search range for a corresponding point for stereo matching based on parallax between the first image and the second image predicted from the first depth information, and
a second measurer configured to obtain second depth information by performing stereo matching for the defined search range using the first image and the second image, the second depth information having a higher spatial resolution than the first depth information,
wherein the patterned light has a combined pattern combining a spatially encoded pattern and a random pattern, the spatially encoded pattern includes a plurality of unit elements arranged regularly, each of the plurality of unit elements is an area corresponding to a depth value, and the random pattern includes a plurality of random pieces arranged randomly, and
the combined pattern satisfies $0.02<S2/S1<0.12$, where S1 is an area size of each of the plurality of unit elements, and S2 is a total area size of the plurality of random pieces added into an area in each of the plurality of unit elements.

2. The three-dimensional measurement system according to claim 1, wherein
the combined pattern satisfies $0.04<S2/S1<0.1$.

3. The three-dimensional measurement system according to claim 2, wherein
each of the plurality of unit elements includes one or more subelements each representing a value of the unit element, and
the plurality of random pieces are added into an area in each of the plurality of unit elements other than an area in which the one or more subelements are located.

4. The three-dimensional measurement system according to claim 2, wherein
each of the plurality of unit elements includes one or more subelements each representing a value of the unit element, and
the plurality of random pieces are added into an area in each of the plurality of unit elements in which the one or more subelements are located, and each of the plurality of random pieces has a luminance level or a color distinguishable from the one or more subelements.

5. The three-dimensional measurement system according to claim 1, wherein
each of the plurality of unit elements includes one or more subelements each representing a value of the unit element, and the plurality of random pieces are added into an area in each of the plurality of unit elements other than an area in which the one or more subelements are located.

6. The three-dimensional measurement system according to claim 1, wherein
each of the plurality of unit elements includes one or more subelements each representing a value of the unit element, and
the plurality of random pieces are added into an area in each of the plurality of unit elements in which the one or more subelements are located, and each of the plurality of random pieces has a luminance level or a color distinguishable from the one or more subelements.

7. The three dimensional measurement system according to claim 1, wherein
the projector and the first camera are set to form an image of each of the plurality of unit elements having a size of 3×3 pixels or greater on an image sensor included in the first camera.

8. The three dimensional measurement system according to claim 1, wherein
the projector, the first camera, and the second camera are set to form an image of each of the plurality of random pieces having a size of ¼×¼ pixels or greater on an image sensor included in each of the first camera and the second camera.

9. A three-dimensional measurement system, comprising:
a projector configured to project patterned light onto a target object;
a first camera configured to image the target object;
a second camera configured to image the target object from a viewpoint different from the first camera; and
an image processor configured to process a first image received from the first camera and a second image received from the second camera to obtain three-dimensional information about the target object,
the image processor including
a first measurer configured to obtain first depth information using the first image with a spatially encoded pattern technique,
a definer configured to define a search range for a corresponding point for stereo matching based on parallax between the first image and the second image predicted from the first depth information, and
a second measurer configured to obtain second depth information by performing stereo matching for the defined search range using the first image and the second image, the second depth information having a higher spatial resolution than the first depth information,
wherein the patterned light has a combined pattern combining a spatially encoded pattern and a random pattern, the spatially encoded pattern includes a plurality of unit elements arranged regularly, each of the plurality of unit elements is an area corresponding to a depth value, and the random pattern includes a plurality of random pieces arranged randomly,
each of the plurality of unit elements includes one or more subelements each representing a value of the unit element, and
the plurality of random pieces are added into an area in each of the plurality of unit elements other than an area in which the one or more subelements are located, or are added into an area in each of the plurality of unit elements in which the one or more subelements are located, and each of the plurality of random pieces has a luminance level or a color distinguishable from the one or more subelements.

10. The three-dimensional measurement system according to claim 9, wherein
the combined pattern satisfies S4<S3/2, where S3 is an area size of a smallest subelement of the one or more subelements, and S4 is an area size of a largest random piece of the plurality of random pieces.

11. The three-dimensional measurement system according to claim 9, wherein
the projector, the first camera, and the second camera are set to form an image of each of the one or more subelements having a size of 3/2×3/2 pixels or greater on an image sensor included in each of the first camera and the second camera.

12. A three-dimensional measurement system, comprising:
a projector configured to project patterned light onto a target object;
a first camera configured to image the target object;
a second camera configured to image the target object from a viewpoint different from the first camera; and
an image processor configured to process a first image received from the first camera and a second image received from the second camera to obtain three-dimensional information about the target object,
the image processor including
a first measurer configured to obtain first depth information using the first image with a spatially encoded pattern technique,
a definer configured to define a search range for a corresponding point for stereo matching based on parallax between the first image and the second image predicted from the first depth information, and
a second measurer configured to obtain second depth information by performing stereo matching for the defined search range using the first image and the second image, the second depth information having a higher spatial resolution than the first depth information,
wherein the patterned light has a combined pattern combining a spatially encoded pattern and a random pattern, the spatially encoded pattern includes a plurality of unit elements arranged regularly, each of the plurality of unit elements is an area corresponding to a depth value, and the random pattern includes a plurality of random pieces arranged randomly, and
the projector and the first camera are set to form an image of each of the plurality of unit elements having a size of 3×3 pixels or greater on an image sensor included in the first camera, or the projector, the first camera, and the second camera are set to form an image of each of the plurality of random pieces having a size of ¼×¼ pixels or greater on an image sensor included in each of the first camera and the second camera.

13. A three-dimensional measurement method, comprising:
projecting patterned light onto a target object;
imaging the target object from different viewpoints to obtain a first image and a second image;
obtaining first depth information using the first image with a spatially encoded pattern technique;
defining a search range for a corresponding point for stereo matching based on parallax between the first image and the second image predicted from the first depth information; and obtaining second depth information by performing stereo matching for the defined search range using the first image and the second image, the second depth information having a higher spatial resolution than the first depth information, wherein the patterned light has a combined pattern combining a spatially encoded pattern and a random pattern, the spatially encoded pattern includes a plurality of unit elements arranged regularly, each of the plurality of unit elements is an area corresponding to a depth value, and the random pattern includes a plurality of random pieces arranged randomly, wherein the combined pattern satisfies $0.02 < S2/S1 < 0.12$, where S1 is an area size of each of the plurality of unit elements, and S2 is a total area size of the plurality of random pieces added into an area in each of the plurality of unit elements.

14. A non-transitory computer readable medium storing a program for causing one or more processors included in a three-dimensional measurement system to perform operations included in the three-dimensional measurement method according to claim 13.

* * * * *